United States Patent [19]
Mazurek et al.

[11] Patent Number: 5,805,117
[45] Date of Patent: Sep. 8, 1998

[54] LARGE AREA TILED MODULAR DISPLAY SYSTEM

[75] Inventors: Niel Mazurek, Huntingdon Valley; Theodore J. Zammit, Ambler; Thomas C. Maloney, Pittsburgh, all of Pa.

[73] Assignee: Samsung Electronics Co., Ltd., Seoul, Rep. of Korea

[21] Appl. No.: 241,599

[22] Filed: May 12, 1994

[51] Int. Cl.⁶ .................................................. G09G 5/00
[52] U.S. Cl. .............................. 345/1; 345/903; 248/919; 348/383
[58] Field of Search ................................ 345/1, 903, 102, 345/77; 248/917–919; 361/700, 392, 393, 394; 359/80, 83, 40; 348/383, 787, 779; 349/73, 109, 152, 158

[56] References Cited

U.S. PATENT DOCUMENTS

| | | | |
|---|---|---|---|
| 3,813,673 | 5/1974 | Holloman | 345/903 |
| 3,821,588 | 6/1974 | Przybylek . | |
| 3,840,695 | 10/1974 | Fischer | 424/630 |
| 3,861,783 | 1/1975 | Dill et al. | 348/791 |
| 3,961,365 | 6/1976 | Payne et al. | 348/799 |
| 4,006,383 | 2/1977 | Luo et al. | 345/76 |
| 4,114,070 | 9/1978 | Asars | 345/206 |

(List continued on next page.)

FOREIGN PATENT DOCUMENTS

| | | | |
|---|---|---|---|
| 0035382 | 9/1981 | European Pat. Off. . | |
| 0206178 | 12/1986 | European Pat. Off. . | |
| 3806421 | 11/1988 | Germany | 345/102 |
| 2264291 | 5/1989 | Japan | 345/903 |
| 3-77992 | 8/1989 | Japan | 345/903 |
| WO 88/00715 | 1/1988 | United Kingdom . | |
| 880071 | 1/1988 | WIPO . | |
| 9108565 | 6/1991 | WIPO | 345/903 |

OTHER PUBLICATIONS

"A new High–Resolution Jumbotron" H. Nakagaws 8A. Onkoshi, SID 1986. pp. 246–249.
"A 51–in. Diagonal Tiled LCD VGA Monitor" N. Mazurek 8T Zammit, SID 1993, pp. 614–617.
"Giant Screen Outdoor Video Monitor" Vidiwall, 1992.
"Alphanumeric & Video Performance of a 6"×6" 30 lines per inch thin film, Transistor–LCD Panel" F.C. Luo, W.A. Hester & T. B. Brody, ISD, 1978 pp. 63–67.
"A Large Screen Color display . . . " C. Myodc et al. Japan Display, 1983, pp. 420–422.

*Primary Examiner*—Amare Mengistu
*Attorney, Agent, or Firm*—Sughrue, Mion, Zinn, Macpeak & Seas, PLLC

[57] ABSTRACT

A tiled flat-panel modular display system includes an array of display modules which contain thin seal liquid crystal displays. Each one of a plurality of module alignment devices attach a respective display module to a large base plate. A frame is connected to the base plate and surrounds the base plate and display modules. A global cover glass assembly disposed above the display modules encloses and protects the display modules. Included in each of the display modules is a light source configuration of a light box and a light box cover which utilizes global light sources that provide efficient uniform backlighting of the corresponding display. The alignment devices permit alignment of the display modules with respect to each other and to a global black mask disposed in the global cover glass assembly to achieve a display system that is seamless in appearance. The tiled display system further utilizes compensation electronics to achieve uniform contrast and transmission characteristics in each of the thin seal displays. In addition, the display system utilizes display circuitry that achieves an improvement in optical performance over conventional displays.

60 Claims, 20 Drawing Sheets

U.S. PATENT DOCUMENTS

| | | | |
|---|---|---|---|
| 4,135,959 | 1/1979 | Luo et al. | |
| 4,156,833 | 5/1979 | Wey et al. | 345/80 |
| 4,408,836 | 10/1983 | Kikuno | 349/73 |
| 4,716,403 | 12/1987 | Morozumi | 349/109 |
| 4,723,119 | 2/1988 | Morimoto | 348/383 |
| 4,745,404 | 5/1988 | Kallenberg | 345/903 |
| 4,771,278 | 9/1988 | Pooley | 345/903 |
| 4,800,376 | 1/1989 | Suga et al. | 345/1 |
| 4,824,215 | 4/1989 | Joseph | 359/40 |
| 4,832,457 | 5/1989 | Sailoh et al. | 349/73 |
| 4,866,530 | 9/1989 | Kalua | 348/383 |
| 4,945,350 | 7/1990 | Kawamura | 345/102 |
| 4,980,774 | 12/1990 | Brody | |
| 4,980,775 | 12/1990 | Brody | |
| 4,982,272 | 1/1991 | Brody | |
| 4,982,273 | 1/1991 | Brody | |
| 4,982,275 | 1/1991 | Brody | |
| 5,067,021 | 11/1991 | Brody | 348/383 |
| 5,068,740 | 11/1991 | Brody | |
| 5,079,636 | 1/1992 | Brody | |
| 5,105,183 | 4/1992 | Beckman | 345/1 |
| 5,299,017 | 3/1994 | Furuno | 248/919 |
| 5,315,695 | 5/1994 | Saito et al. | 345/77 |
| 5,461,510 | 10/1995 | Vilnes | 349/449 |
| 5,508,833 | 4/1996 | Saito et al. | 359/80 |
| 5,537,127 | 7/1996 | Jingu | 345/903 |
| 5,557,436 | 9/1996 | Blose et al. | 359/80 |

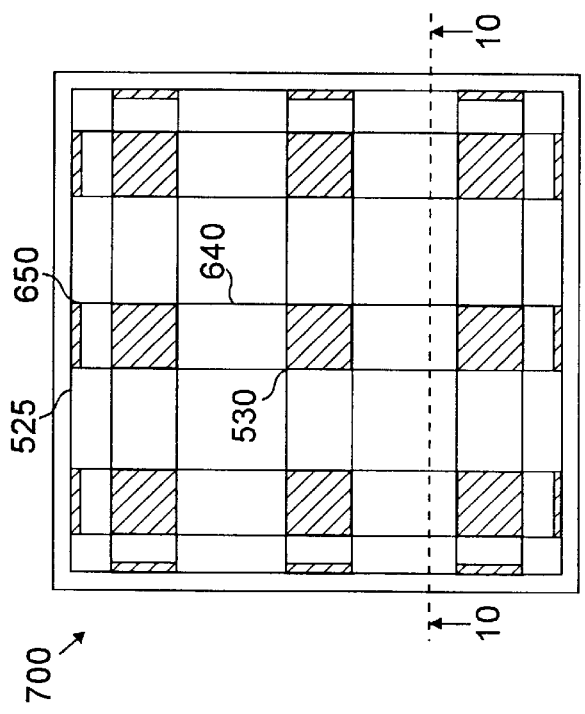
FIG. 9
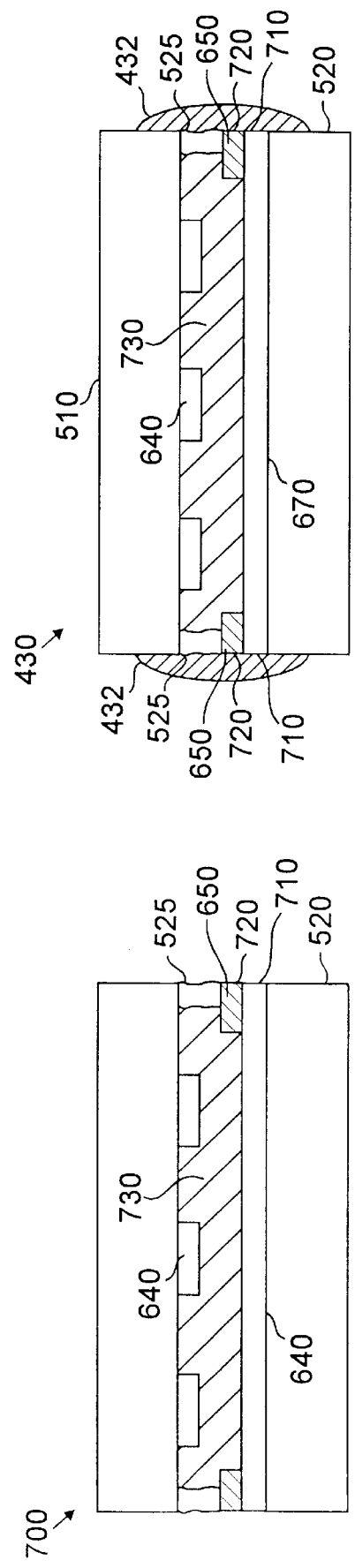
FIG. 11
FIG. 10

LARGE AREA TILED MODULAR DISPLAY SYSTEM

This invention was made with United States Government support under contract F33615-92-C-3806 awarded by the Department of the Air Force, Wright Laboratory. The Government has certain rights in the invention.

FIELD OF THE INVENTION

This invention relates to large area liquid crystal display systems and more specifically to display systems consisting of tiled arrays of liquid crystal display modules.

BACKGROUND OF THE INVENTION

Flat-panel displays have achieved increasing acceptance in the marketplace, particularly with regard to small, hand-held television sets and portable computers. These displays are quite thin compared to conventional cathode ray tubes, yet are able to display video and other information. Various attempts have been made to develop large area flat-panel displays as replacements for cathode ray tube display systems, particularly in situations where a great deal of information must be processed and displayed, such as in high definition television systems. Although the primary use of flat-panel displays are for television and computer displays, flat-panel displays can be used in any number of different applications, such as for advertising, status displays, video conferencing, highway signs, office directories or avionics' displays.

One example of a modular flat-panel display is described in U.S. Pat. No. 4,832,457 which consists of a liquid crystal material sandwiched between a two-by-two glass plate array, and a cover glass plate centered over the array. The area under the cover glass plate defines a display area which contains picture elements and switching elements. The cover glass plate has a smaller major surface area than the combined major surface area of the glass plate array which produces perimeter regions on the major surface area of the four glass plate array that are not covered by the cover glass. Electrical contact pads for connecting external drive circuits to the switching and picture elements in the display area are disposed in this perimeter region.

A disadvantage of this type of display system is the limitation of a maximum of a two-by-two array of display components because of the requirement that perimeter regions exists on each of the array panels for the electrical contact pads. As a result, the size of the display area is severely restricted and is substantially dependent on the production technology of the liquid crystal display components. Current production technology cannot produce liquid crystal displays of sufficient size to form a large area two-by-two array display. Thus, this display system is inadequate for large screen televisions or computer displays.

Another example of a modular flat-panel display is disclosed in U.S. Pat. No. 4,980,774, which is assigned to the assignee of the present invention, and which is hereby incorporated by reference. U.S. Pat. No. 4,890,774 describes a modular flat-screen, direct-view display system consisting of an array of liquid crystal displays, wherein each display can be formed by a polymer dispersed liquid crystal (PDLC) material sandwiched between two glass plates. Drive circuits located external to a display region are connected to picture elements in the display region by row and column conductors and wrap-around vertical edge interconnects.

The wrap-around vertical edge interconnects are made by known metalization and photolithographic techniques on an adhesive side of a thin, insulating tape which has a thickness of approximately 0.001 inches. The tape is bonded to the drive circuits, the vertical edges of the display, and the row and column conductors. The displays are then arranged in close proximity to one another such that boundary picture elements proximate corresponding edges of adjacent displays are separated by substantially the same distance as adjacent picture elements within one of the displays. Such a display system can produce a displayed image that is substantially uninterrupted at the boundaries between displays. Unlike the display system according to U.S. Pat. No. 4,832,457, the module array of this display system may contain a sufficiently large number of display modules to produce a large area display. However, display modules according to U.S. Pat. No. 4,980,774 having the desired performance characteristics can be relatively difficult to produce because of the present state-of-the-art performance of PDLC.

Global or local backlighting systems have been used for direct view modular displays. A global light system relies on a single light source system to provide illumination for the entire display system. An advantage of such a backlighting system is the balanced light provided to each one of the liquid crystal displays in a corresponding display system. A disadvantage of global lighting is that the mechanical components necessary to support the individual displays and route the electrical wiring prevent the global backlight source from being positioned substantially close to the back of the displays. Since light tends to radiate in all directions from a source, the amount of light generated by the global backlight source that illuminates the displays decreases as the light source is positioned further away from each of the displays.

To counteract this effect, backlight sources with increased power outputs have been utilized, but such sources have greater power and heat dissipation requirements. In an alternative approach, light blocks or wedges have been utilized with the global backlight sources to direct as much light as possible to the displays. However, such blocks provide marginal improvement and add significant weight, requiring more expensive and complicated mechanical support systems.

In contrast, local backlighting uses a plurality of local light sources with each light source providing illumination for a corresponding display in the system. Local light sources can be positioned in close proximity to the displays and therefore provide more efficient illumination than global backlight systems. However, it is costly to manufacture local light sources that provide uniform light over an array of displays in a display system. As a consequence, local backlight sources may cause some displays to appear brighter than other displays in the display system resulting in a undesirable "checkerboard" effect.

Conventional passive matrix liquid crystal display systems incorporate electrical circuits which display an image in substantially real time as a corresponding fully multiplexed video information signal is received by the display. For instance, if the video information signal is for a VGA compatible display of a PC-type personal computer, the video signal will contain 640-by-480 pixel data in a 60 Hz non-interlaced frame of 0.0167 seconds in duration. Conventional passive matrix displays must sequentially activate 640 picture elements or 1920 picture elements in each one of the 480 rows of a monochrome or color display, respectively, for a relatively short period of time during each one of the 0.0167 second frame periods. As a consequence, conventional displays have poor optical performance compared to conventional cathode ray tube (CRT) displays.

Passive matrix liquid crystal displays can achieve improved optical performance by utilizing a two-page scheme for displaying pixel information in the upper and lower half of the display simultaneously, which effectively doubles the activation time for each pixel in each frame in comparison with the fully multiplexed display technique described above. However, the resulting optical performance is still inferior to that produced by a conventional CRT display.

There is a recognized need for a readily manufacturable direct view, large area liquid crystal display system with a better backlighting source and better optical performance.

SUMMARY OF THE INVENTION

A readily manufacturable tiled modular display system includes an array of display modules that contain corresponding thin seal liquid crystal displays to produce a displayed image that appears seamless to a viewer. Each one of a plurality of module alignment devices attach a respective one of the display modules to a global base plate. A housing surrounds the base plate and display modules. A global cover glass assembly is disposed above the display modules which in combination with the housing enclose and protect the display modules.

Each one of the display modules contains a display driver circuit board, a light source configuration and the thin seal display. The light source configuration includes a light box, light sources extending through the light box and a translucent light box cover to balance the luminance output. The light sources may be fluorescent lamp which extend through an entire row or column of the display modules. The light box cover utilizes an advantageous shape to improve the balance of the luminance output across the front surface of the light box cover. An optional pattern diffuser may be utilized adjacent the light box cover to enhance the uniformity of luminance output.

The thin seal liquid crystal display in each display module comprises a liquid crystal material sandwiched by two substantially identically sized substrates. A thin perimeter seal, which may be on the order of 0.005 inches, seals the two substrates together and contains the liquid crystal material in a display area. An array of picture elements extend across the display area with boundary picture elements disposed proximate the thin seal and display edges.

The separation between the boundary picture elements and the display edge is such that the distance between corresponding boundary picture elements of adjacent display panels is equal to the distance of the picture elements contained in the display modules. In this manner, the display modules may be positioned sufficiently close to one another to produce the tiled display system having a seamless appearance. At least one thin electrical conductor connects electrical edge contacts of a corresponding thin seal display to the respective display driver circuit board.

The global cover glass assembly may contain a global black mask which comprises opaque row and column stripes on a transparent sheet. The opaque rows and columns permit visibility of the picture elements and hide the mechanical seams of adjacent display modules. The global black mask further provides an alignment grid for alignment of each one of the display modules. The global cover glass assembly also includes a diffusion mask to provide an improved viewing angle of the display.

Alignment of the display modules with respect to each other and the global black mask is achieved by the alignment devices. Each alignment device can move a corresponding display module in the horizontal and vertical direction relative to the array of display modules. In addition, the alignment devices facilitate the replacement of individual display modules without disturbing the alignment of the other display modules.

In order to avoid a "checkerboard effect" caused by a tiled display system with display modules of varying brightness, the present invention utilizes a contrast adjustment circuit to adjust and balance the contrast, brightness and transmission of each thin seal display. Thus, the present invention does not require the use of thin seal displays manufactured with high tolerances at great expense. Since a tiled display configuration is used, display information may be provided to the display modules in a parallel manner. Correspondingly, an interface circuit having a lower multiplex rate is utilized to produce a display system with improved optical performance.

BRIEF DESCRIPTION OF THE DRAWINGS

FIG. 9 is a top view of a reduced substrate assembly which may be used to form the thin seal display of FIG. 5;

FIG. 10 is a cross-sectional view of the reduced substrate assembly of FIG. 9;

FIG. 11 is a cross-sectional view of the thin seal display of FIG. 5;

FIG. 14 is an example array of luminance output values taken across the light source configuration of FIG. 12;

FIG. 15 is an array of correction values corresponding to the luminance output array of FIG. 14 which are used to produce the patterned diffuser of FIG. 13;

DETAILED DESCRIPTION

Figure 1:
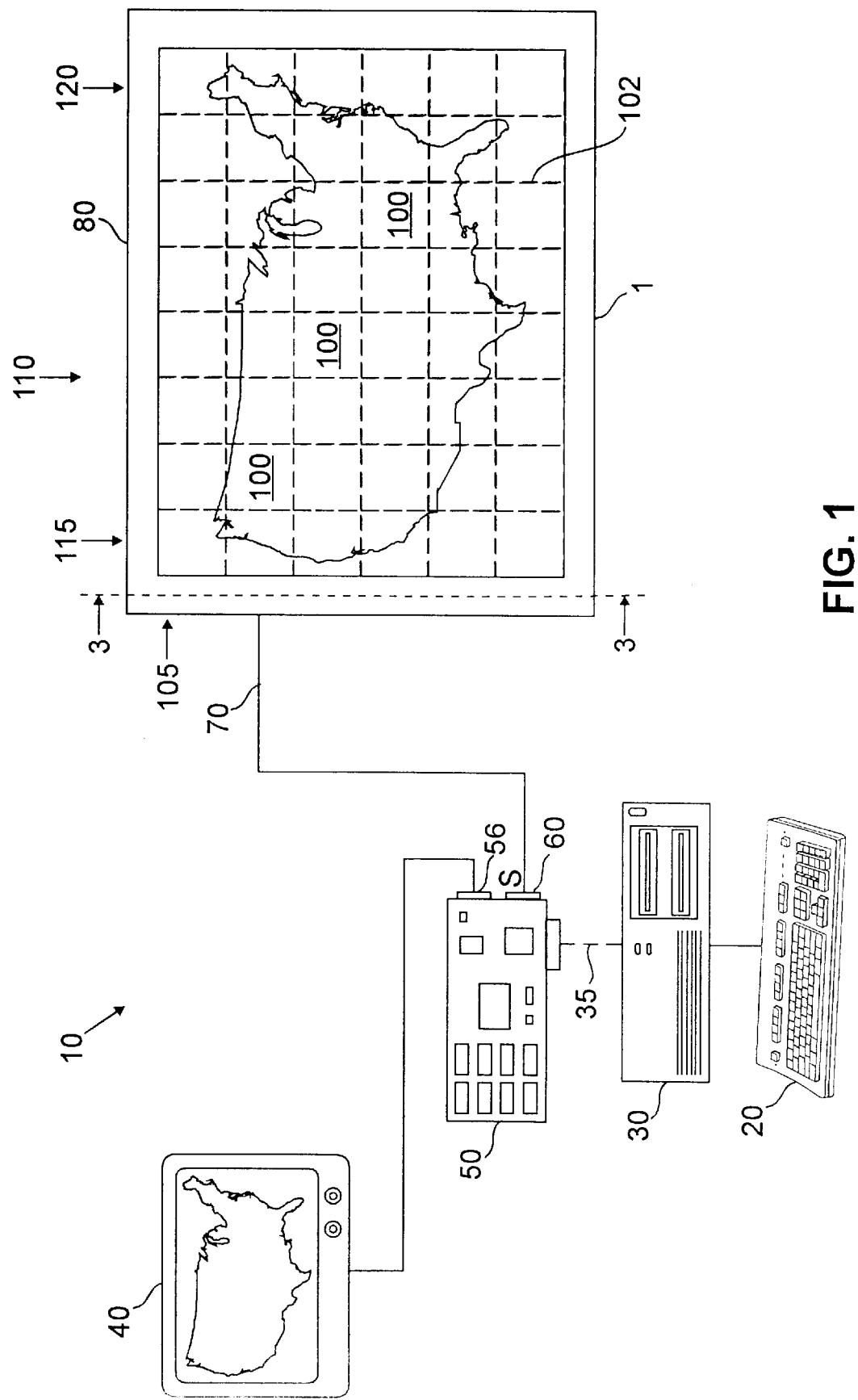
FIG. 1 is a personal computer system utilizing a tiled modular display system according to the present invention.

A tiled modular display system 1 according to the present invention is shown connected to a computer system, such as a PC-type personal computer 10, in FIG. 1. Referring to FIG. 1, the computer system 10 includes an input device, such as a keyboard 20, a processing and storage unit 30, and an optional output device, such as the cathode ray tube (CRT) 40. The storage and processing unit 30 contains a VGA-compatible video card 50 which has a passive matrix LCD driver output 60. The driver output 60 is connected to the tiled display system 1 by a communications line 70. The video card 50 also has an optional CRT output 56 for providing video information to the optional output device 40.

The processing and storage unit 30 is connected to the input device 20 and contains a 16-bit ISA bus which is well known in the PC personal computer art. The video card 50 is connected to the ISA bus as represented by the dashed-line 35. The video card 50 is normally contained within the processing and storage unit 30 and has been shown external to the processing and storage unit 30 for clarity. Although the computer system 10 is shown as a personal computer, the computer system 10 may suitably be any one of the computer types well known in the art, such as a mainframe computer, a minicomputer, a workstation, or a personal computer.

The video card 50 may utilize a standard passive matrix LCD display VGA controller to generate LCD driver signals S containing row and column display information for 640-by-480 pixel frames in a 60 Hz non-interlaced manner. One suitable VGA controller for the video card 50 is a GGD6410 and GD6340 chipset available from Cirrus Logic of Freemont, Calif. Since the video format is 60 Hz non-interlaced, sixty frames of information are displayed on the tiled display system 1 and output device 40 every second. As a consequence, information for a video frame is transmitted and displayed every 0.0167 seconds (1 second/60 frames). The VGA video format used by the video card 50 is compatible with available applications software.

The video card data output 60 transmits the LCD driver signals S to the tiled display system 1 over the communications line 70. If the distance between the processing and storage unit 30 and the tiled display system 1 is sufficiently long, such as on the order of 25 feet, suitable line buffers (not shown) may be utilized with the communications line 70. Suitable commercially available line buffers include those that conform to EIA standard RS-422, such as the line buffer transmitter and receiver pair, Part Nos. DS-26F31 and DS-26F32, from National Semiconductor, Inc. of Santa Clara, Calif. A video card optional CRT output 56 transmits an analog signal corresponding to the LCD driver signals S to the output device 40.

The tiled display system 1 includes a housing 80 which contains an array of display modules 100. The display modules 100 are shown separated by dashed lines 102 in FIG. 1 for clarity. However, to the viewer, the tiled display system 1 will appear to be one large display with substantially invisible seams between the display modules 100 to indicate that it is a modular display.

In FIG. 1, the tiled display system 1 contains 48 of the display modules 100 arranged into an array of six rows 105 and eight columns 110. First and last columns 115 and 120 of display modules 100 are shown on the extreme left and right side of the tiled display system 1, respectively. Each one of the display modules 100 may contain 80 rows and 80 columns of pixels such that the tiled display system 1 contains 480 rows and 640 columns of pixels. Therefore, the tiled display system 1 is capable of displaying a standard 640-by-480 VGA pixel image. The depiction of the present invention with the array of 640-by-480 pixels is for exemplary purposes only and is not intended to be a limitation of the invention. A display module 100 according to the present invention may contain a different sized array of pixels.

Figure 2:
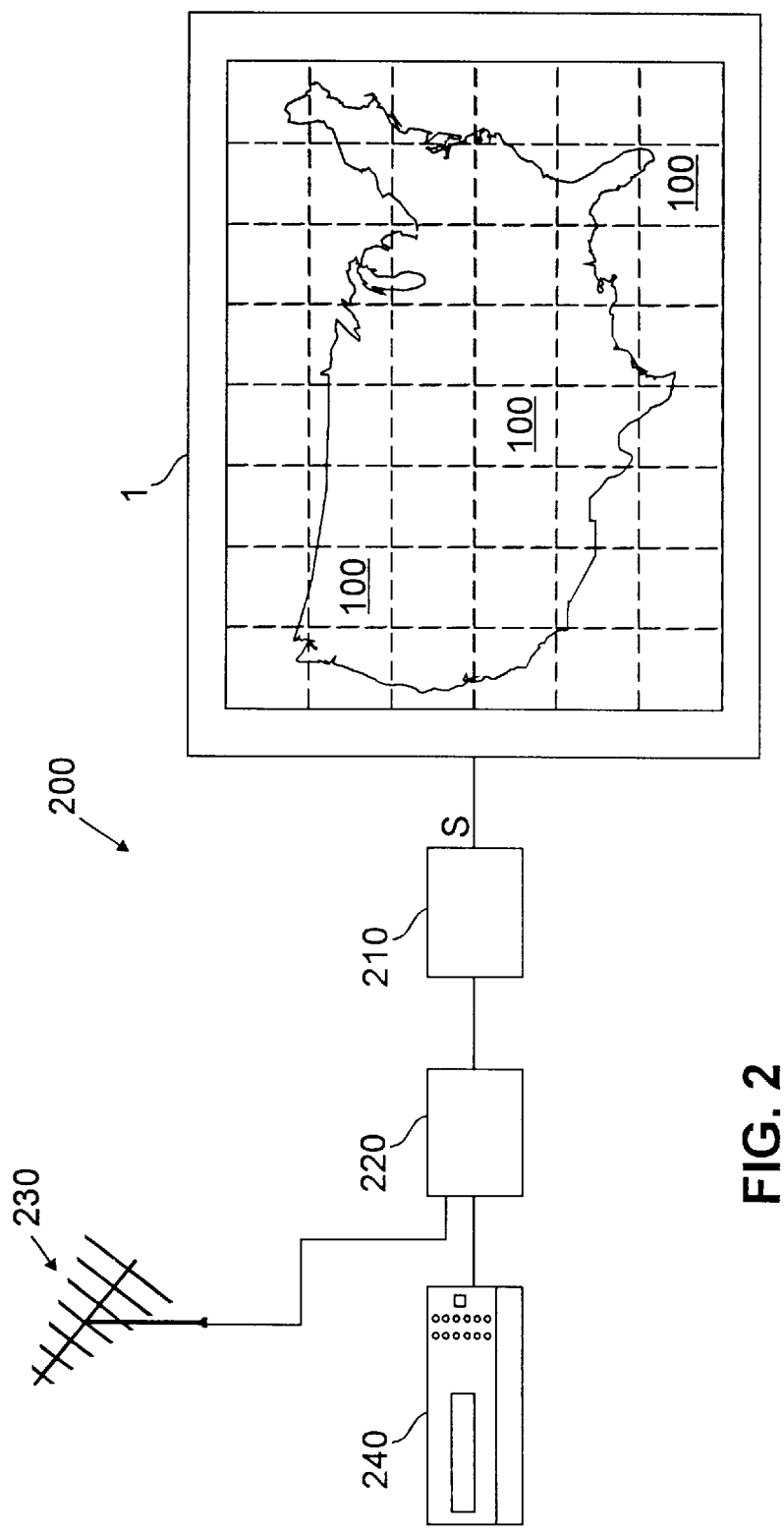
FIG. 2 is a television system utilizing the tiled modular display system according to the present invention.

Another application of the tiled display system 1 of the present invention is in a television system 200 as shown in FIG. 2. Referring to FIG. 2, the television system 200 contains the tiled display system 1, a video formatting unit 210 and a video tuner, such as an NTSC television tuner 220. The video tuner 220) may receive video signals from an external source, such as signals received by an antenna 230. In a similar manner, the video tuner 220 may also receive video signals from a local television cable system (not shown), or from playback units, such as a video cassette recorder 240, or a laser disk player (not shown).

In operation, the video tuner 220 provides an analog video signal of an image to be displayed to the video formatting unit 210. The video formatting unit 210 operates in a substantially similar manner to the interface card 50 in FIG. 1 and generates a corresponding passive matrix LCD driver information signals S which are transmitted to the tiled display system 1. The tiled display system 1 of FIG. 2 may contain a 8-by-6 array of display modules 100 to form 640-by-480 pixels as in the tiled display system 1 of FIG. 1. Such a configuration would be suitable to display broadcasted or recorded video signals in conventional NTSC television format. A greater number of rows and columns of pixels may be used in the tiled display system 1 to display images of high definition television (HDTV) video formats. Further, the array configuration and number of display modules 100 used to form the tiled display system 1 may be different to that shown in FIG. 2, to accommodate the potentially different aspect ratio of the HDTV formats.

Figure 3:
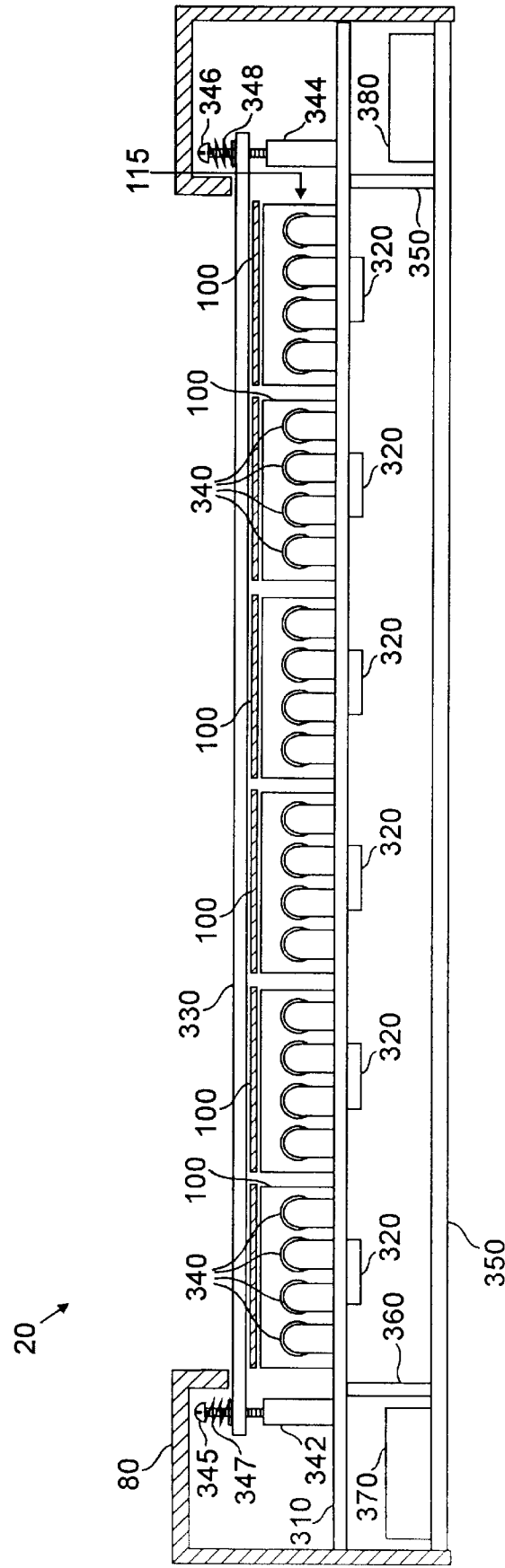
FIG. 3 is a cross-sectional view of the tiled modular display system of FIGS. 1 and 2.

FIG. 3 depicts a cross-sectional view of the tiled display system 1 taken along a line 3 of FIG. 1. In FIG. 3, each one of the modules 100 is attached to a base plate 310 by respective module alignment devices 320. A first plurality of fluorescent lamp sockets 340 are attached to the base plate 310 adjacent the first column 115 of display modules 100 as shown in FIG. 1. In a similar manner, a second plurality of fluorescent lamp sockets (not shown) are attached to the base plate 310 adjacent the last column 120 of display modules 100 of FIG. 1. The second plurality of fluorescent lamp sockets are substantially in alignment with the first plurality of fluorescent lamp sockets 340 adjacent the first column 115 of display modules 100.

A plurality of fluorescent lamps are connected to respective first and second lamps sockets 340, and extend through each of the rows 105 of the display modules 100 in FIG. 1 from the first column 115 to the last column 120. In the alternative, the filed display system 1 may be configured with the fluorescent lamps extending through each one of the columns 110 of the display modules 100. In such a configuration, the fluorescent lamps sockets 340 would be disposed in top and bottom portions 342 and 344 of the tiled display system 1 adjacent the display modules 100.

A rear plate 350 is attached to, and held a fixed distance away, from the base plate 310 by suitable spacer devices well known in the art, such as standoffs 360. A fluorescent light ballast 370, which is electrically connected to the lamp sockets 340 for illuminating the fluorescent lamps, may be disposed on the rear plate 350. A power supply 380, such as those well known in the art, for providing electrical energy to the display modules 100 may also be disposed on the rear plate 350. The rear plate 350 may further provide attachment mechanisms, such as hooks, so that the tiled display system 1 may be mounted on a wall. By mounting the fluorescent light ballast 370 and power supply 380 on the base plate 350, the tiled display system 1 effectively electrically isolates these power components from the display modules 100 that are attached to the base plate 310. The housing 80 is secured to the rear plate 350. In addition, optional cooling fans (not shown) may be positioned on at least one side of the housing 80 to force air through the modules 100 to maintain relatively cool operating temperatures.

A global cover glass assembly 330 is spring-biased against the array of display modules 100 by standoffs 332 and 334 which secure the global cover glass assembly 330 to the base plate 310. Screws 345 and 346 and springs 347 and 348 of the standoffs 342 and 344 force the global cover glass assembly 330 in contact with the display modules 100. The housing 80 and global cover glass assembly 330 operate to enclose and protect the array of modules 100.

Figure 4:
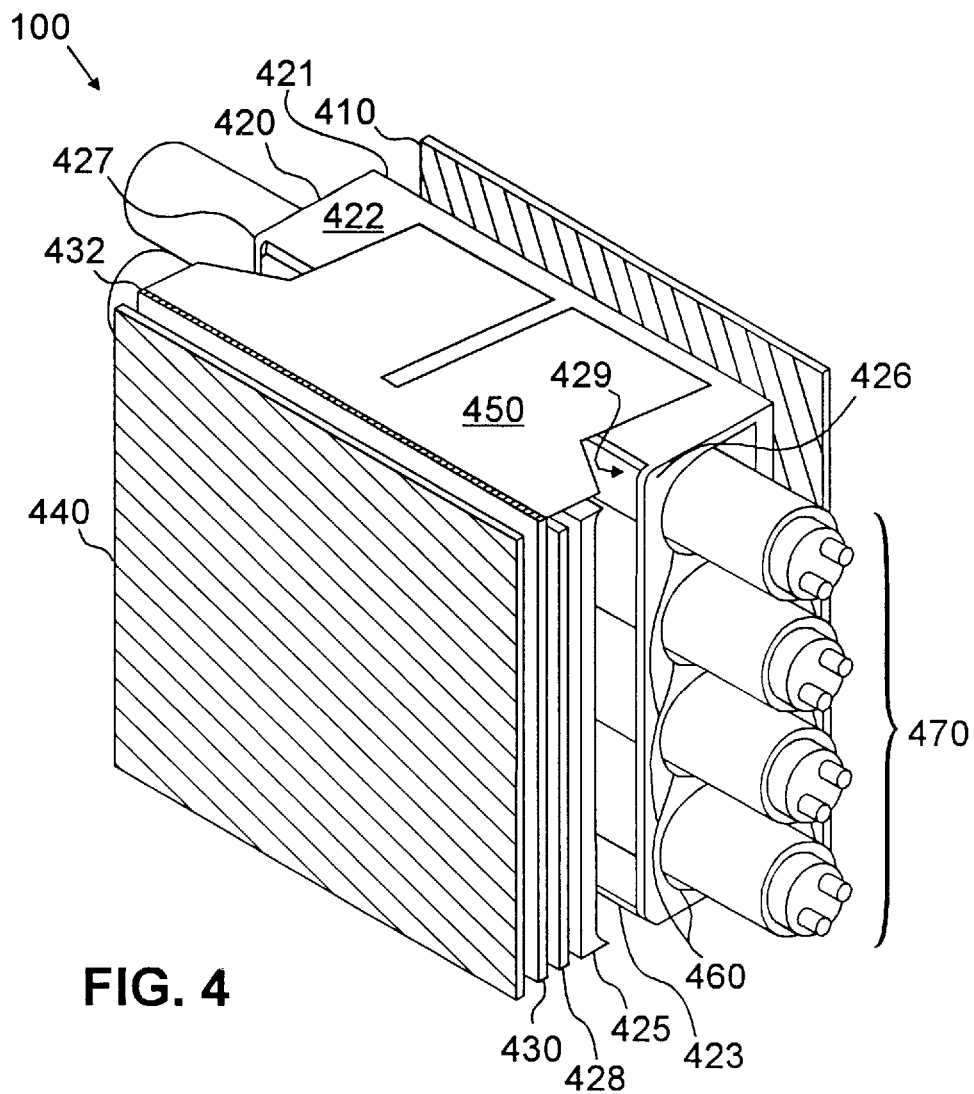
FIG. 4 is an exploded parts view of a display module used in the tiled display system of FIGS. 1 and 2.

FIG. 4 depicts an exploded parts view of a suitable display module 100 for use in the tiled display system 1. Alternative suitable display module configurations include those that utilize optically passive displays, such as liquid crystal and electrophoretic displays, and light emitting displays, such as electroluminescence and field active displays. Referring to FIG. 4, the display module 100 includes a display driver circuit board 410 attached to a base wall 421 of a light box 420. A light box cover 425 is positioned adjacent an open end 429 of the light box 420. An optional patterned diffuser 428 may be positioned adjacent the light box cover 425 as is shown in FIG. 4. A thin seal liquid crystal display 430 is disposed adjacent the optional patterned diffuser 428. An optional color filter 440 is disposed on top of, and may be laminated to, the thin seal display 430.

In addition, a translucent compressible material (not shown) may be disposed between the thin seal display 430 and the patterned diffuser 428 such that when the global cover glass assembly 330 of FIG. 3 is biased against the display modules 100 by the screws 345 and 346 and springs 347 and 348, the thin seal displays 430 are slightly compressed toward the light box cover 425. The addition of the translucent compressible materials further insures that the global cover glass assembly 330 is actually in contact with all portions of the entire display surface area of each one of the display modules 100.

A suitable thin seal display 430 has electrical edge contacts 432 which are electrically connected to a thin connector 450. The thin connector 450 electrically connects the edge contacts 432 of the thin seal display 430 to driver circuits (not shown), such as those well known in the art, located on the driver board 410. The edge contacts 432 and corresponding thin connectors 450 may extend across any number of the four sides of the thin seal display 430 and light box 420. A suitable thin connector 450 is a flexible heat seal connector available from Elform of Reno, Nev., and has a thickness on the order of 0.001 inches.

The light box 420 is an open box having first and second horizontal walls 422 and 423, first and second vertical walls 426 and 427, and the base wall 421. The interior or exterior surfaces of the vertical horizontal and base walls 422, 423, 426, 427 and 421 are painted with a suitable white reflective paint to maximize the amount of light generated out of the open end 429 of the light box 420. A plurality of corresponding pairs of holes 460 are disposed on the first and second vertical walls 426 and 427, respectively, to permit the extension of a like plurality of light sources, such as fluorescent lamps 470, through the light box 420. The fluorescent lamps 470 connect to, and are held in place by, the fluorescent lamp sockets 340 adjacent the first and last display module columns 115 and 120 of the tiled display system 1 as is shown in FIG. 3. In the alternative, the fluorescent lamps 470 and corresponding sockets 340 may be disposed along the columns 110 of the display modules 100 in the tiled display system 1.

The multiple lamp design per display module 100 provides sufficient redundancy of light sources such that the failure of one of the fluorescent lamps 470 does not significantly effect readability of the display module 100. The fluorescent lamps 470 should be suitably spaced and positioned from the rear of the thin seal display 430 to maximize luminance output and minimize luminance variation. Commercially available one-inch diameter fluorescent lamps, such as those available from General Electric Corporation or from Sylvania Corporation may be used as the fluorescent lamps 470.

Figure 24:
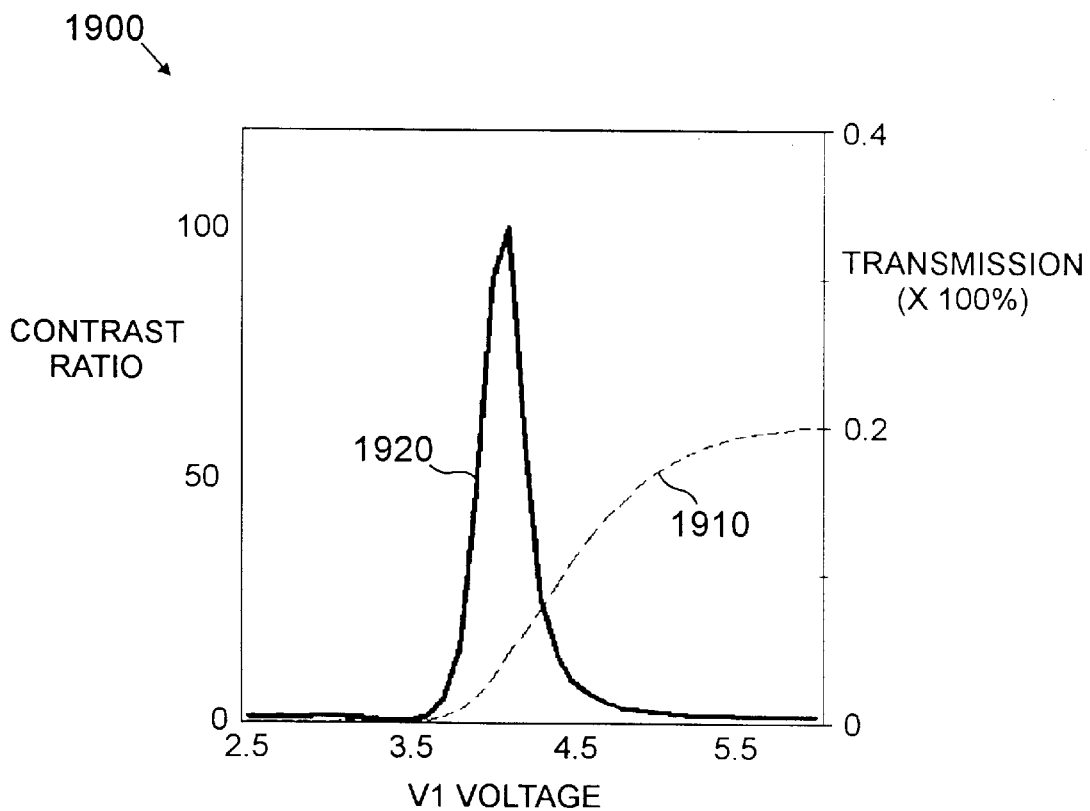
FIG. 24 is a contrast and transmission ratio chart of a suitable passive matrix liquid crystal display that may be used in the display module of FIG. 4.

In operation, driver circuits on the display driver board 410 receive display signals from an interface circuit, such as the interface circuit described in detail below with regard to FIGS. 24–26. The driver circuit board 410 provides the necessary driver signals on the thin connector 450 to the thin seal display 430 to produce a corresponding image. Moreover, the light box 420 and light box cover 425 utilize the light generated by the plurality of fluorescent lamps 470 to provide uniform backlighting of the display 430 to produce a direct view display. In addition, the color filter 440 provides the necessary coloration to produce the desired color image.

Figure 5:
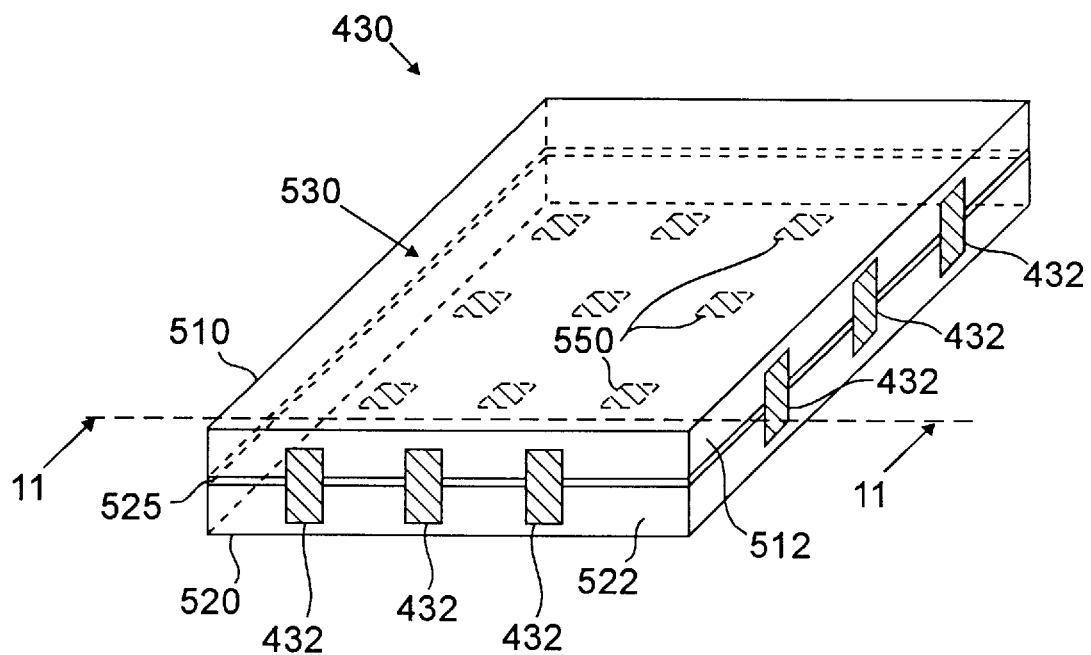
FIG. 5 is a suitable thin seal liquid crystal display for use in the display module of FIG. 4.

A suitable passive matrix thin seal display 430 for use in the display module 100 is shown in FIG. 5. In the alternative, active matrix picture elements may be utilized in the displays 430 to achieve a further improvement in optical performance. Referring to FIG. 5, a first transparent substrate 510, such as a glass plate, is arranged on top of a second transparent substrate 520. The second substrate 520 is substantially the same size and shape of the first substrate 510. A liquid crystal material, such as a twisted nematic (TN) liquid crystal material, is sandwiched between the substrates 510 and 520. The liquid crystal material is contained in the display 430 and protected from the environment by a thin seal 525 which secures the substrates together.

A matrix of picture elements 530 are arranged in the panel 430 to form the pixels of the display module 100 and are described in greater detail below with regard to FIG. 6. Boundary picture elements 550 are the picture elements 530 that are positioned adjacent edge surfaces 512 and 522 of the first and second substrates 510 and 520. The plurality of edge contacts 432 are disposed on the substrate edge surfaces 512 and 522. Each one of the edge contacts 432 overlaps both of the edge surfaces 512 and 522, as well as the thin seal 525. The edge contacts 432 are electrically connected to the picture elements 530 to enable control of the picture elements 530 to form the desired display image which is also described below with regard to FIG. 6.

Each display module 100 in the tiled display system 1 of FIG. 1 contains one thin seal display 430 in the manner shown in FIG. 4 to achieve a large area display with a seamless appearance. Correspondingly, the distance between boundary picture elements 550 and the substrate edges 512 and 522 of the panel 430 must be such that when two displays 430 are positioned adjacent one another, the spacing between corresponding boundary picture elements 550 of the two adjacent displays 430 is equal to the spacing between respective picture elements 530 within each of the displays 430. For example, if the respective picture elements 530 are positioned a distance of 0.014 inches from each other in a display 430 then boundary picture elements 550 of adjacent displays 430 should also be positioned 0.014 inches from each other.

A spacing of 0.014 inches can be achieved by positioning the boundary picture elements 550 a distance of approximately 0.005 inches from the substrate edges 512 and 522 and using a thin connector 450 of FIG. 4 attached to the edge contacts 432, having a thickness of approximately 0.001 inches. As a result, the display modules 100 may be separated from one another such that the distance between the thin connectors 450 on the adjacent displays 430 is 0.002 inches. Therefore, the corresponding distance between adjacent boundary picture elements 550 of adjacent displays 430 is the desired 0.014 inches.

One technique for manufacturing a passive matrix thin seal display 430 having boundary picture elements 550 disposed within 0.005 inches from the substrate edges 512 and 522 will now be described with reference to FIGS. 6–11. This technique is also described in the contemporaneously filed U.S. patent application Ser. No. 08/241,489, entitled "THIN SEAL LIQUID CRYSTAL DISPLAY AND METHOD OF MAKING SAME", which is assigned to the assignee of the present invention, and which is hereby incorporated by reference in its entirety. Although the construction of a passive matrix thin seal display 430 is described below, it would be readily understood by those skilled in the art that an active matrix thin seal display for use in the display module 100 of FIG. 4 could be. constructed in a substantially similar manner.

Figure 6:
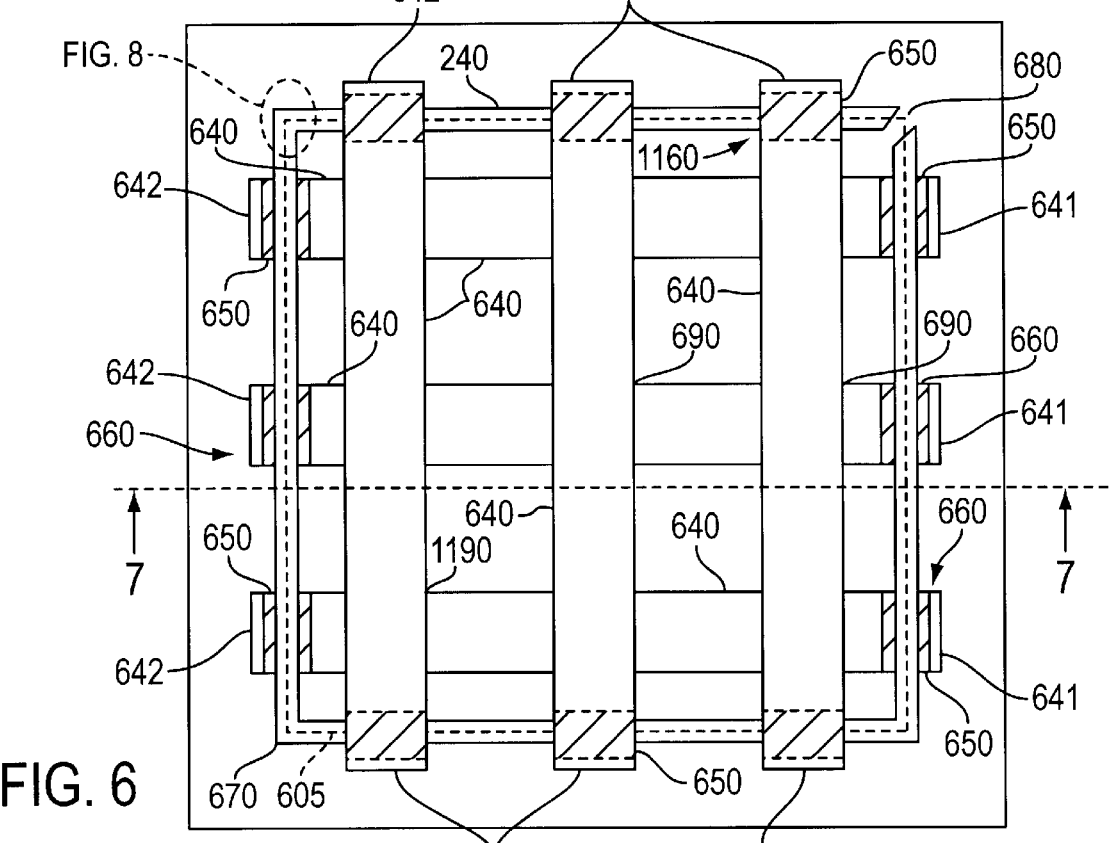
FIG. 6 is a substrate assembly utilized in the manufacture of the thin seal display of FIG. 5.
Figure 7:
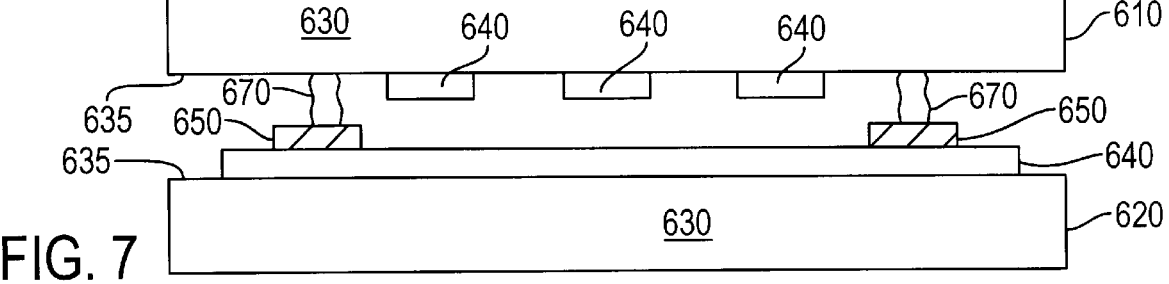
FIG. 7 is a cross-sectional view of the substrate assembly of FIG. 6.

FIG. 6 depicts a substrate assembly 600 utilized in constructing the thin seal display 430 of FIG. 5. A cross-sectional view of the substrate assembly 600 taken along a line 7 in FIG. 6 is shown in FIG. 7. Referring to FIGS. 6 and 7, the substrate assembly 600 consists of top and bottom metalized substrates 610 and 620. Each one of the metalized substrates 610) and 620 consists of an oversized substrate 630 which has a larger major surface area than that desired for the resulting surface area of the thin seal display 430. An outline dimension of the display 430 is represented by a broken outline 605. A plurality of electrically conductive strips 640 are disposed on respective first major surfaces 635 of the substrates 630. Both ends 641 and 642 of each of the electrically conductive strips 640 may extend beyond the outline dimension 605 of the display 430. In the alternative, at least one of the ends 641 or 642 of each of the electrically conductive strips 640 should extend beyond the outline dimension 605.

The electrically conductive strips 640 may consist of metal, such as indium tin oxide (ITO), and may be formed on the substrate surface 635 by metalization and photolithographic techniques well known in the art. ITO is a preferred material as it is substantially transparent at particular resistance levels and has sufficient adhesion characteristics to glass.

Electrically conductive pads 650 are then coated over the electrically conductive strips 640 in areas 660 which cross over the outline dimension 605 in the manner as shown in FIGS. 6 and 7. The conductive pads 650 on the metalized substrate 610 in FIG. 6 are shown in a shadow-line form as these pads are facing into the drawing. Sputtered chrome is a suitable material for the electrically conductive pads 650 because it is relatively easy to sputter and control, and adheres well to itself, ITO and glass. Alternative materials for the electrically conductive pads 650 include nichrome and aluminum.

Referring to FIG. 7, the thickness of the electrically conductive pads 650 may be on the order of 1500 angstroms when the thickness of the electrically conductive strips 640 is on the order of 300 angstroms. However, if the thickness of the electrically conductive strips 640 is greater than 1500 angstroms, the electrically conductive pads 650 may be omitted from the metalized substrates 610 and 620. The suitable thickness as described above is necessary to form the necessary electrical connection between the electrical edge contacts 432 and the picture elements 530. Each one of the picture elements 530 will be formed by an overlap region 690 of the electrically conductive strips 640 on the metalized substrates 610 and 620.

In constructing the substrate assembly 600 of FIGS. 6 and 7, a bead of a seal material, such as an epoxy 670, is dispensed in a defined pattern around the outline dimension 605 of the display 430 except for a small opening or gap 680 on the metalized substrate 620. The epoxy bead 670 is laid over the substrate surface 635 and the electrically conductive pads 650. The gap 680 is left open in the epoxy bead 670 to act as a filling port for the liquid crystal material. A magnified view of a portion of the epoxy bead 670 in a region 8 of the substrate assembly 600 of FIG. 6 is shown in FIG. 8.

Figure 8:
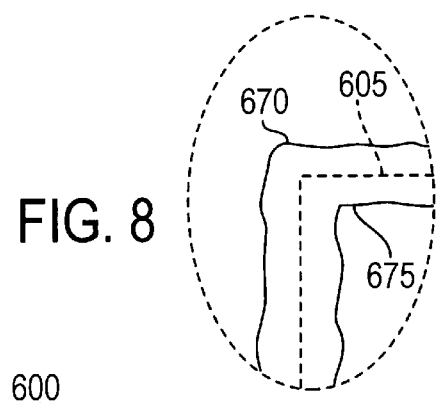
FIG. 8 is a magnified view of an epoxy bead used in the substrate assembly of FIGS. 6 and 7.

Referring to FIG. 8, the epoxy bead 670 must be precisely positioned over the outline dimension 605 of the thin seal display 430 and an interior edge 675 of the epoxy bead 670 must possess minimal edge variation in order to achieve the thin seal 625 in the display 430. In a similar manner, the height of the epoxy bead 140 must be maintained with minimal variation. However, the width of the epoxy bead 670 need not be controlled in a precise manner, but must be determined in order to produce the thin seal 525 of FIG. 5. An adequate width and height of the epoxy bead 670 is 0.014 inches and 21 microns, respectively. One suitable epoxy material for the epoxy bead is EPO-TEK B9021.

After the epoxy bead 670 has been deposited on the metalized substrate 620, the top and bottom metalized substrates 610 and 620 are then arranged in a manner such that the electrically conductive strips 640 on the substrates 610 and 620 are oriented orthogonal with respect to one another as shown in FIGS. 6 and 7. The arranged metalized substrates 610 and 620 are then heat cured at 150° C. for 15 minutes.

The step of heat curing the arranged metalized substrates 610 and 620 forms an epoxy seal which joins the two metalized substrates 610 and 620 together. The resulting structure is then filled with a liquid crystal material, such as a twisted nematic (TN) liquid crystal material, through the gap 680. The gap 680 is then sealed. One suitable method for sealing the gap 680 while maintaining the defined shape of the interior edge of the seal is to inject UV curable epoxy into the gap 680 while exposing only the gap to UV radiation by using a suitable mask and UV light source. Master Bond UV15-7 and Norland No. 61 are suitable UV curable epoxys to seal the gap 680.

In order to form the thin seal display 430 of FIGS. 4 and 5, the major surfaces of substrate assembly 600 of FIGS. 6–8 containing the liquid crystal material is reduced in a precise manner, such as by precision sawing through the top and bottom metalized substrate 610 and 620 to the outline dimension 605, to form a reduced substrate assembly 700 as shown in FIG. 9. The precision sawing should cut through the epoxy seal formed from the epoxy bead 670 and the electrically conductive strips and pads 640 and 650. In the alternative, the assembled substrate 600 may be reduced by precision sawing close to the outline dimension 605, such as to within 0.002 inches of the outline dimension 605, and then precision ground to the outline dimension 605.

A cross-sectional view of the reduced substrate assembly 700 taken along a line 10 in FIG. 9 is shown in FIG. 10. In FIGS. 9 and 10, the major surface area of the metalized substrates 610 and 620 have been precision reduced, to form the substrates 510 and 520 of the display 430 of FIG. 5. In a similar manner, the precision reduction of the epoxy seal formed from the epoxy bead 670 of FIGS. 6 and 7 generates the thin seal 525.

Since the epoxy bead 670 is applied in a precise manner with minimal edge variation, the thickness of the corresponding thin seal 525 can be precisely controlled during the precision reduction process. Similar components of the substrate assembly 600 of FIGS. 6 and 7 and the reduced substrate assembly 700 of FIGS. 9 and 10 are like numbered for clarity, for instance, the electrically conductive strips 640 and pads 650. Referring to FIG. 10, the precision reduction process leaves edges 710 and 720 of the electrically conductive strips 640 and pads 650 exposed between the substrates edges surfaces 512 and 522. Also shown in FIG. 10, is a contained liquid crystal material 730.

FIG. 11 depicts a cross-sectional view of the thin seal display 430 of FIG. 5 taken along line 11. The display 430 consists of the reduced substrate assembly 700 of FIGS. 9 and 10 with the deposited edge contacts 432. The edge contacts 432 are electrically conductive contacts which are laid over the exposed edges 710 and 720 of the electrically conductive pads 650 and electrically conductive strips 640 in the manner as shown in FIG. 11. A suitable material for the edge contacts 432 is sputtered chrome. One method for depositing the edge contacts 432 is to place the reduced substrate assembly 700 into an edge sputter mask fixture (not shown) which has apertures of the size, shape, and in the positions where the edge contacts are to be formed. Metal is then sputtered on the fixture edge and through the fixture apertures to form the edge contacts 432.

The use of nine picture elements 530 which are formed by the intersection 690 of the two sets of orthogonal electrically conductive strips 640 in FIGS. 5, 6 and 9 is for ease of illustration only, and is not intended to act as a limitation of the invention. A suitable thin seal display 430 may have a surface area dimension of 5.119 inches by 5.119 inches with an electrically conductive strip 640 configuration of 80 rows by 240 columns which form 80 by 80 color pixels.

In order for the tiled display system 1 of FIG. 1 to maintain a seamless appearance it is desirable for each of the thin seal displays 430 contained in the display modules 100 to have uniform luminance output over the entire surface of the display 430 and with respect to the other displays 430. Lower luminance output at edge regions of the display modules 100 adjacent other display modules 100 would likely make the seams between the display modules 100 detectable by a viewer.

In order to produce the seamless appearance, luminance output measurements taken across the tiled display system 1 should not vary by more than approximately 5% to 10% from an average value over short distances within a display module 100 or at boundaries between adjacent display modules 100. However, since global light sources 470 extend through the light box 420 of each display module 100 of FIG. 4, a lesser amount of luminance output will be generated out of the open end 429 of the light box 420 in edge regions adjacent horizontal walls 422 and 423 which extend parallel to the direction of the fluorescent lamps 470. Lower luminance output is generated in these regions because none of the fluorescent lamp 470 extend directly under these regions.

Figure 12:
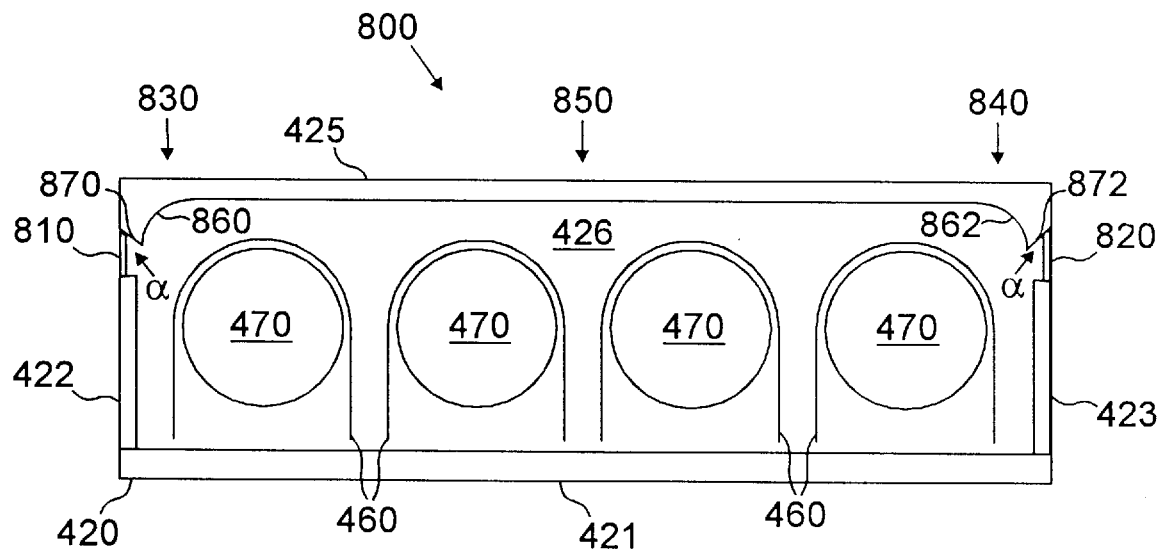
FIG. 12 is a cross-section view of a light source configuration used in the display module of FIG. 4.

FIG. 12 depicts a cross-sectional view of a light source configuration 800 for use in the display module 100 of FIG. 4 which consists of the light box 420 and one suitable light box cover 425 to achieve the desired substantially uniform luminance output. The cross-sectional view of the light source configuration 800 in FIG. 12 has been taken in a direction along the light box side sidewalls 423 and 424 of FIG. 4. Identical components of the light box 420 of FIGS. 4 and 12 are like numbered for clarity, for example, the horizontal walls 422 and 423 and the base wall 421.

The light box cover 425 is attached to the light box 420 by support posts 810 and 820. The light box cover 425 may be made of a suitable transparent material, such as polycarbonate or acrylic plastics. Horizontal edge regions 830 and 840 of the cover 425 extend in a parallel direction to the fluorescent lamp 470 and receive less light from the fluorescent light lamps 470 than other regions of the light box cover 425, such as a center region 850. One suitable method to increase the luminance output in the horizontal edge regions 830 and 840 is to include concave surfaces 860 and 862 and beveled edges 870 and 872 in those regions 830 and 840 of the light box cover 425. This shape captures a portion of light generated by the fluorescent lamps 470 and redirects the light out of the light box cover 425 in the regions 830 and 840. An optimal angle between the beveled edges 870 and 872, and the corresponding light box horizontal side walls 423 and 424 is approximately 50° in order to provide sufficient luminance output from the regions 830 and 840.

A diffuser, such as the patterned diffuser 428 of FIGS. 4 and 12 may be positioned adjacent the light box cover 425 on a side opposite the light box 420 to better improve the uniformity of the luminance output across the light source configuration 800. The patterned diffuser 428 is a transparent sheet, such as a plastic or mylar sheet, with varying shading in respective regions to provide relatively dark shading in those regions where the luminance output of the light box cover 425 is greatest, and relatively light shading in those regions where the luminance output is the lowest. The addition of the patterned diffuser 428 to the light source configuration 800 of FIG. 12 produces a light source having a substantially uniform luminance output across all regions including the horizontal edge regions 830 and 840. A suitable patterned diffuser 428 which may be used with the light source configuration 800 of FIG. 12 is shown in FIG. 13.

Figure 13:
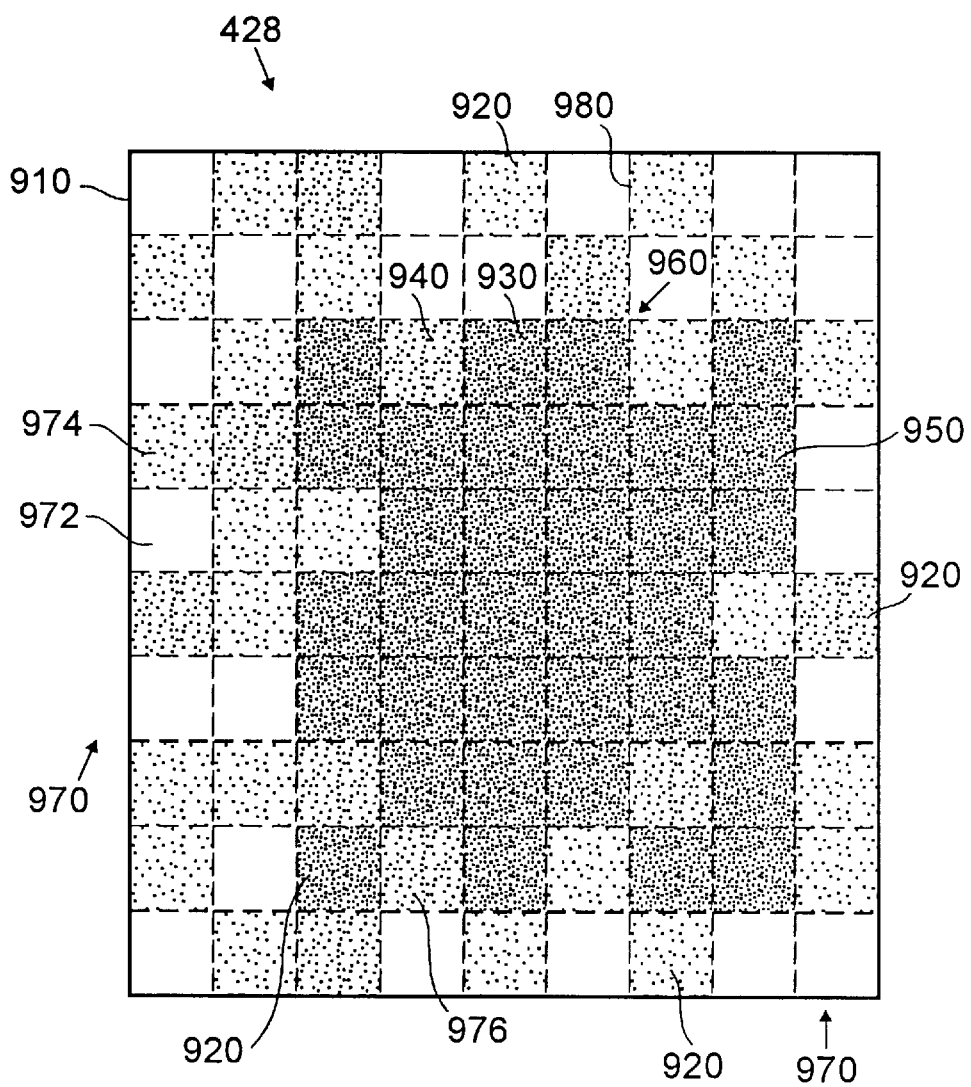
FIG. 13 is a top view of an optional pattern diffuser that may be used in the display module of FIG. 4.

In FIG. 13, the patterned diffuser 428 consists of a thin translucent plastic sheet 910 which contains a predetermined amount of shading in particular regions 920. The positions of the regions 920 correspond to the respective positions of the picture elements 530 of the thin seal display 430 shown in FIG. 5. The shading in each of the patterned diffuser regions 920 in FIG. 13 consists of different densities of dot patterns. For example, the dot pattern density in region 930 is greater than the dot pattern density in region 940. As a result, the region 930 of the patterned diffuser 428 would block more light than the region 940.

In operation, the dot patterns 920 of heavier densities would be positioned over those regions of the light box cover 425 with greater luminance output and the dot patterns 920 of finer densities would be positioned over those light box cover regions with lower luminance output to achieve a substantially uniform luminance output. For example, the patterned diffuser 428 of FIG. 13 utilizes three different densities of dot patterns to provide sufficient shading of light to produce the uniform light output. However, the patterned diffuser 428 of this invention is not intended to be limited to any particular number of different amounts of shading.

In FIG. 13, a large density dot pattern 950 provides the greatest shading and is used primarily in the regions 920 in a center area 960 where the greatest luminance output of the light source configuration 800 of FIG. 12 is found. In a similar manner, the regions 920 in a perimeter area 970 of the patterned diffuser 428 where the light source configuration 800 luminance output is lowest have no dot patterns, such as, in region 972, or light density dot patterns, such as in region 974. A medium density dot pattern 976 is used to provide a medium amount of shading in those regions 920 that are typically between the center area 960 and the perimeter area 970.

The patterned diffuser 428 is shown in FIG. 13 with dashed lines 980 separating the various regions 920 for ease of illustration only. Patterned diffusers 428 according to this invention should not have any demarcation of its regions 920. The shading of the patterned diffuser 428 should be specifically arranged for a particular light source configuration arrangement, such as the light source configuration 800 of FIG. 12, in order to achieve a maximum level of uniformity of the luminance output. A method of generating a suitable patterned diffuser 428 will now be described with reference to FIGS. 14–16.

Figures 14, 15:
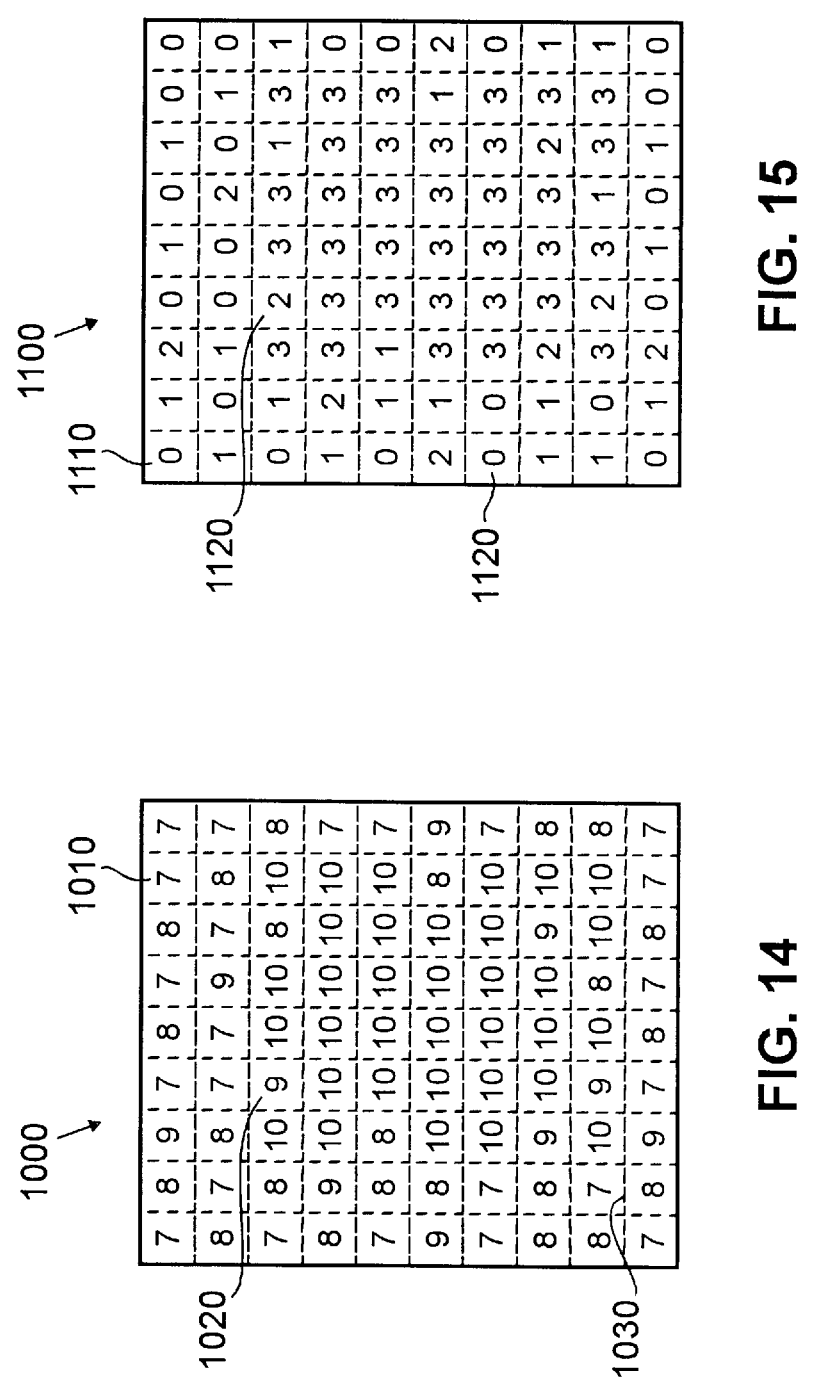

In order to generate a proper patterned diffuser 428 for a particular light source configuration 800, the luminance output at various regions across the light source configuration 800 must be tested. FIG. 14 depicts an example array of luminance output values 1000 taken across the light source configuration 800 shown in FIG. 12. Each value 1010 in the array 1000 corresponds to a relative amount of detected luminance output at a respective area of the light box cover 425. Each one of the respective light box cover areas provides illumination for a corresponding picture element 530 in the thin seal display 430 of FIGS. 4 and 5. Each of the luminance output values are scaled values between "0" and "10" wherein a "10" indicates maximum luminance output from the light box cover 425 and "0" indicates no luminance output of the cover. The particular light box cover 425 whose luminance output is shown by the array 1000 in FIG. 14 ranges between "7" and "10". For example, region 1020 in the third row and fourth column of the array 1000 corresponds to the picture element 530 located in the third row and fourth column of the display 430 of FIG. 4 and contains a luminance output value of "9".

For purposes of clarity, each value 1010 of the array 1000 is bounded by a dashed box outline 1030 to assist in understanding the relationship between the array values 1010 and the respective regions of the light box cover 425 of FIG. 12 that correspond to positions of the thin seal display picture elements 530 as shown in FIG. 5. In addition, for ease of illustration, the array 1000 is shown in FIG. 14 as having 10-by-10 values 1010 to account for a thin seal display 430 having a corresponding array of 10-by-10 picture elements 530, but it is not intended that the display 430 or the patterned diffuser 428 be limited to any particular number of picture elements or regions. A suitable display 430 and patterned diffuser 428 for the tiled display system 1 may contain an array of 80-by-80 pixels and values 1010.

In order to maintain the maximum possible uniform luminance output of the diffuser regions 920, the patterned diffuser 428 should be shaded in a manner such that luminance output of the patterned diffuser 428 is equal in value to the lowest detected luminance output in the array 1000 of FIG. 14. Thus, a proper patterned diffuser 428 for the light source configuration 800 of FIG. 12 that is characterized by the array 1000 should possess sufficient shading in the regions 920 as seen in FIG. 13 to produce a luminance output of value "7" across the entire patterned diffuser 428.

FIG. 15 depicts an array of correction values 1100 which may be used to generate an appropriate patterned diffuser 428 to operate with the light source configuration 800 of FIG. 12 to achieve a light source having a uniform luminance output of a value "7". Each correction value 1110 in the correction value array 1100 corresponds to the amount of shading required in the corresponding patterned diffuser 428 of FIG. 13. For example, a value 1120 of "0" indicates that no shading is required in a corresponding region of the pattern diffuser while values of "1", "2" or "3" indicate varying amounts of shading from lightest to greatest, respectively.

A correction value 1130 in the third row and fourth column is a "2" which indicates the amount of shading for the luminance output value 1020 in the third row and fourth column of the array 1000 of FIG. 14. The correction values 1110 of FIG. 5 are generated by subtracting from each corresponding value 1010 in the array 1000 of FIG. 14 the lowest detected luminance output value in the array 1000. Thus, the correction value "2" is generated by subtracting the lowest detected luminance output value of "7" from the luminance output value 1020 of "9". In this manner, the luminance value in each region of the light box cover 425 is corrected to a luminance output value of "7".

Figure 16:
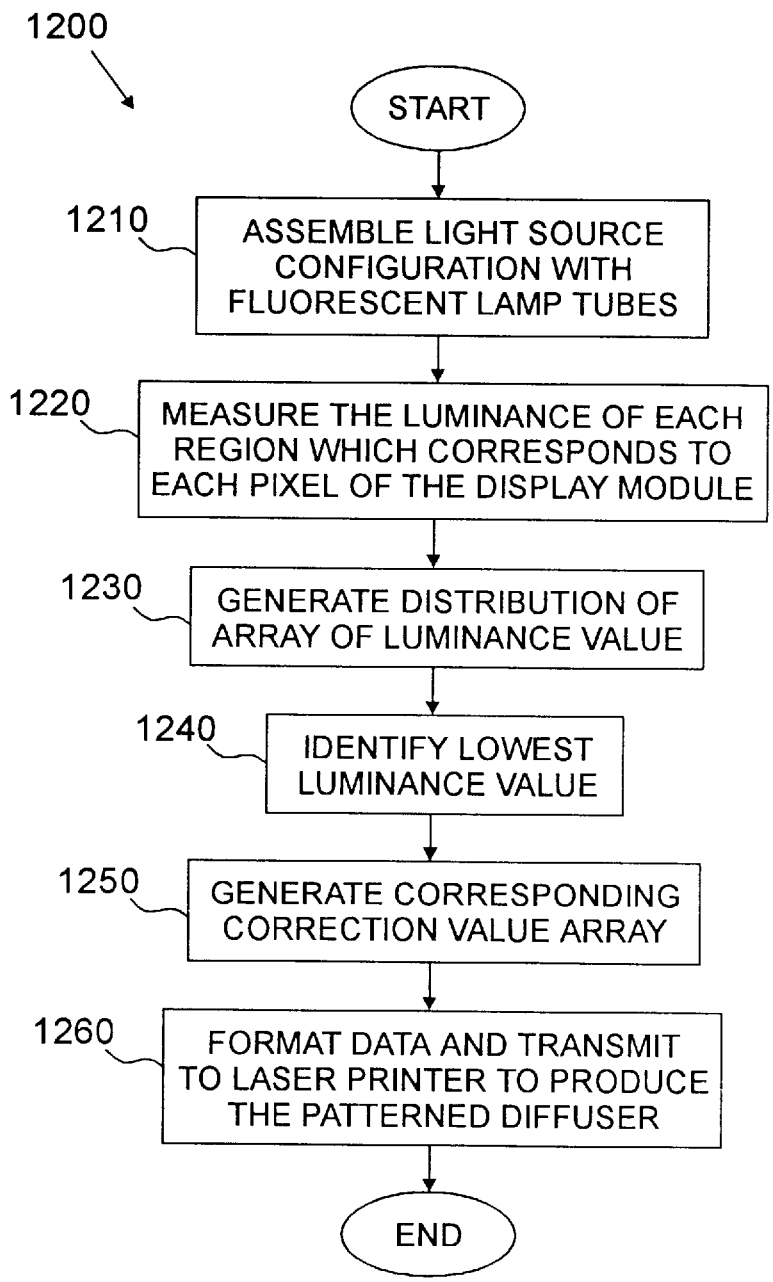
FIG. 16 is a flowchart of one suitable method for producing an appropriate shading for the pattern diffuser of FIG. 13.

One suitable routine 1200 for producing a proper patterned diffuser 428 for a particular light source configuration 800 of FIG. 12 is illustrated in FIG. 16. Referring to FIG. 16, in step 1210, a light source configuration 800 containing a light box 420, a light box cover 425 and fluorescent lamp 470 is assembled for testing. The luminance of each region that corresponds to a picture element 530 in the display 430 of FIG. 5 is then measured in step 1220.

The routine 1200, then proceeds to step 1230, where a luminance distribution or array, such as the array 1000 of FIG. 14 is generated. Then in step 1240, the lowest luminance output value is identified from the array of measured luminance output values 1010. A correction value array 1100 of FIG. 15 is then generated in step 1250 by taking the difference between the corresponding measured luminance output values 1010 of FIG. 14 for the respective regions and the overall lowest measured luminance output value. The data is then formatted and transmitted to a laser printer in step 1260 where the correction values 1110 of FIG. 15 are transformed into a corresponding dot density shading 920 in the respective regions 925 on a transparent plastic sheet 910. The resulting shaded plastic sheet may then be used as the patterned diffuser 428 shown in FIG. 13, or a template used in the generation of the patterned diffuser 428.

Figure 17:
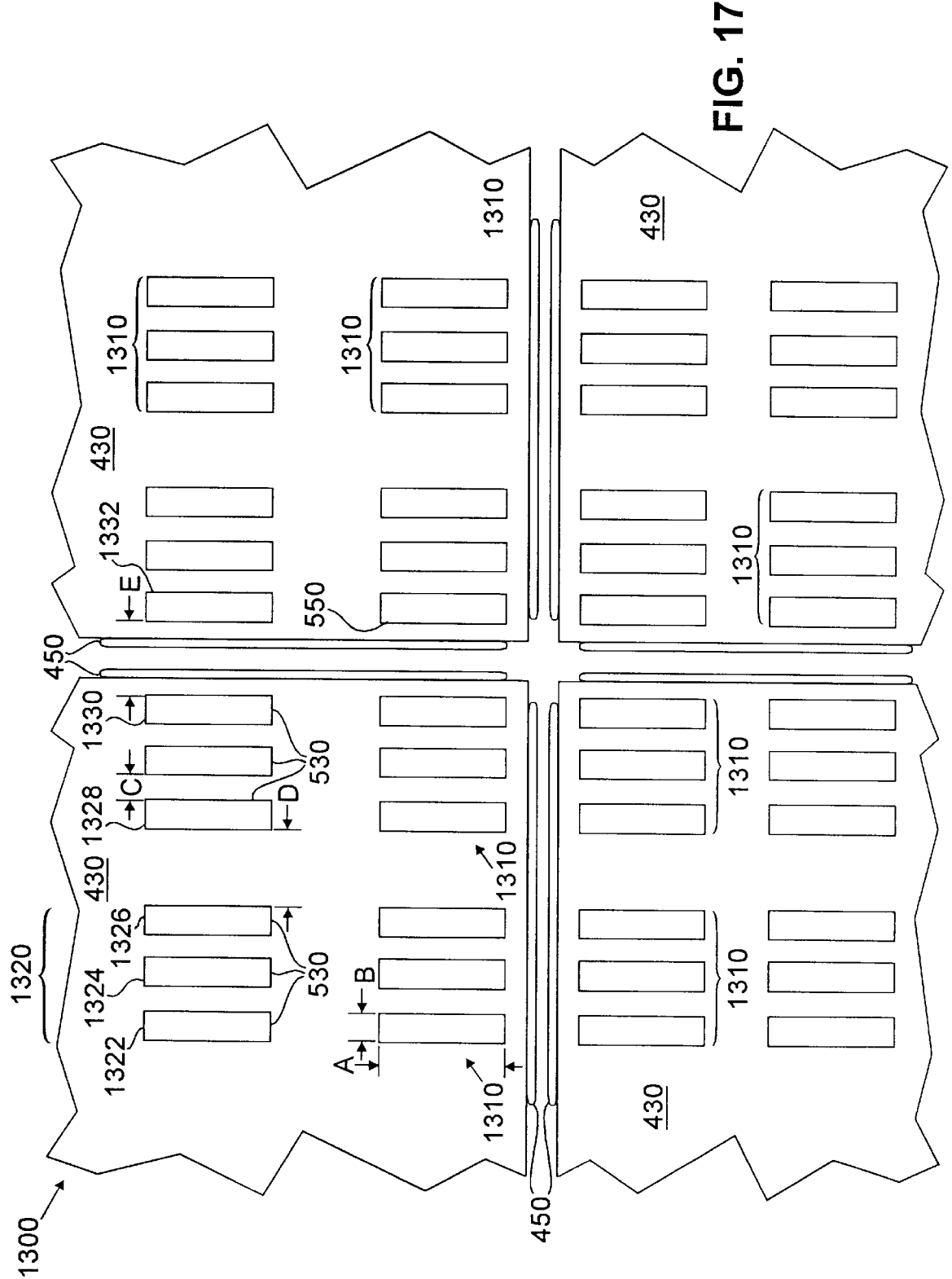
FIG. 17 is a top view of adjacent corner portions of four thin seal displays in the tiled modular display system of FIGS. 1 and 2.

The tiled display system 1 of FIG. 1 further utilizes specific spacing arrangements between the picture elements 530 of the displays 430 in order to achieve its seamless appearance. One suitable spacing arrangement of the picture elements 530 in a portion 1300 of the tiled display system 1 containing four adjacent corner portions of the thin seal displays 430 of FIG. 5 is shown in FIG. 17. In FIG. 17, the picture elements 530 are arranged into groups of three to form pixels 1310 which are suitable for use in a color display system. For example, pixel 1320 is formed by picture elements 1322, 1324 and 1326. Each one of the displays 430 of FIG. 17 contains 80 rows by 240 columns of picture elements 530 which form 80 rows by 80 columns of pixels 1310.

Each one of the three picture elements 530 in each one of the pixels 1310 may be approximately 0.012×0.049 inches in size as shown by distances A and B, respectively, and may be separated from one another by 0.007 inches as shown by a distance C. Also, the separation between adjacent picture elements 530 of adjacent pixels 1310, such as picture elements 1326 and 1328 may be 0.014 inches as shown by a distance D. Likewise, the separation between corresponding boundary picture elements 550 of adjacent thin seal displays 430 should be 0.014 inches to achieve the seamless appearance. Thus, the separation between picture elements 1330 and 1332 as shown by a distance E is 0.014 inches. Such a 0.014 inches separation may be achieved where the boundary picture elements 550 are positioned substantially in contact with the thin seal 525, shown in FIG. 5, having a width of approximately 0.005 inches, using a 0.001 inches thick thin connector 450 attached to the edge contacts 432 on each display 430 and with adjacent display 430 positioned 0.002 inches apart from one another.

Figure 18:
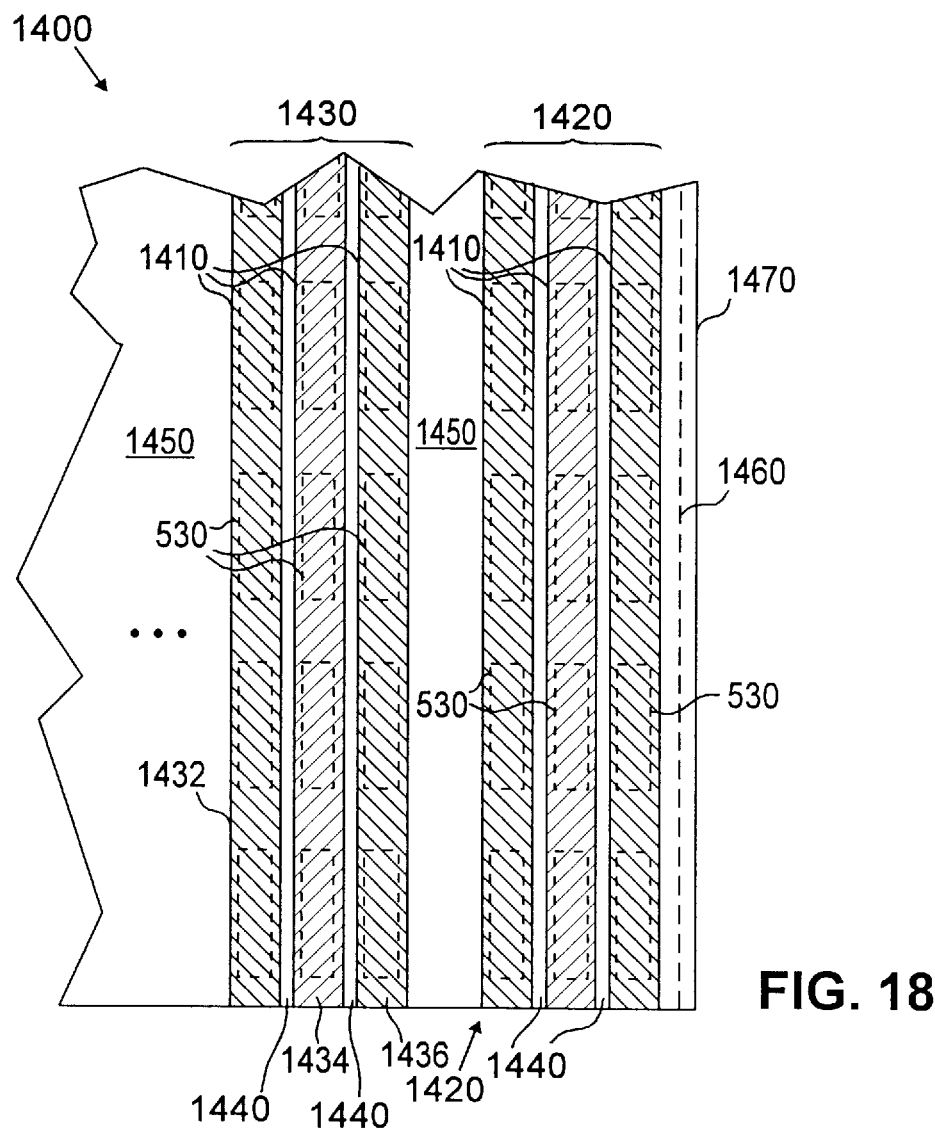
FIG. 18 is a top view of a suitable color filter mask which may be used in the display module of FIG. 4.

FIG. 18 illustrates a corner portion 1400 of a suitable color filter mask 440 which may be arranged on top of, or laminated to, a corresponding thin seal display 430 having pixels 1310 of three picture elements 530, as shown in FIG. 17, to produce the color display system. The color filter mask 440 is a substantially transparent sheet or film, such as plastic or mylar, which contains a plurality of tinted parallel color stripes 1410. The number and placement of color stripes 1410 will be equal to that of the columns of picture elements 530 or three times the number of pixels 1310 of the corresponding thin seal display 430. For example, for the thin seal display 430 having 240 columns of picture elements 530 that form 80 columns pixels described above, the corresponding color filter mask 440 will possess 240 color stripes.

The color stripes 1410 on the color filter mask 440 are arranged into groups 1420, such as group 1430, consisting of a red stripe 1432, a green stripe 1434, and a blue color stripe 1436 each. The positioning and spacing of color stripes 1410 within each of the groups 1420 is a function of the spacing of the columns of picture elements 530 that form the pixels 1310 of the thin seal display 430. The positions of the picture elements 530 of the pixels 1310 under the color stripes 1410 are represented by dashed line boxes, such as dashed line box 1440 in FIG. 18. In operation, the picture elements 530 forming the pixels 1310 of the displays 430 variably shutter the light produced by the light source configuration 800 of FIG. 12 and control the illumination of the color filter 440 to create a color display. The combination of the shuttered red, green and blue tinted picture elements 530 of each pixel 1310 will produce the appearance of the required colors of an image at a suitable viewing distance from the tiled display system.

The color stripes 1410 shown in FIG. 18 are wider than the width of the corresponding picture elements 530 to accommodate for the spreading of light transmitted through the picture elements. To insure that the stripes 1410 are of sufficient width relative to the picture elements 530, the color stripes 1410 may be printed on the transparent sheet such that the adjacent stripes 1410 in each group 1420 overlap a small amount to form regions 1440. For example, if the picture elements are 0.012 inches wide and are separated by 0.007 inches as shown in FIG. 17, the overlap regions 1440 of a corresponding color filter mask 440 may be 0.002 to 0.003 inches wide.

Substantially black stripes 1450 separate the boundary stripes 1410 of adjacent group 1420 in order to inhibit the transmission of light in regions between the picture elements 530. The substantially black stripes 1450 may have a width of 0.010 inches when the separation between boundary picture elements 530 of adjacent pixels 1310 is 0.014 inches as shown in FIG. 17. Such a configuration will allow for a 0.002 inch spreading of the light at the edges of the boundary picture elements 530 of adjacent pixels 1310. The substantially black stripes 1450 may be produced by the overlaying of red, green and blue stripes.

In a similar manner, substantially black edge stripes 1460 are disposed adjacent vertical edges 1470 of the color filter mask 440. Such black stripes 1460 may have a width of 0.003 inches when the corresponding column of picture elements 530 have edges positioned 0.005 inches from the vertical mask edges 1470. As a consequence, the edge stripes 1460 allow a 0.002 inches spreading of the light exiting the column of picture elements 530 adjacent the edges 1470.

The width of the color stripes 1410 should be at least the width of the corresponding picture elements 530. Although the color stripes 1410 in the color mask 440 of FIG. 18 are oriented in the column direction, the color stripes 1410 and pixels 1310 may be arranged in the row direction as an alternative configuration of the present invention. Such an orientation may be utilized to improve the horizontal viewing angle of the corresponding tiled display system 1 shown in FIG. 1.

In addition, the color filter mask 440 need not contain color stripes 1410 but may contain individual tinted color blocks which cover corresponding picture elements 530 in the display 430. Further, the color mask 440 may be omitted from the display module 100 to produce a monochromatic gray scale display. In such an instance, each picture element 530 may be used as a corresponding pixel of the display system.

The liquid crystal material should be chosen in conjunction with the configuration of the display 430 such that the display 430 normally prevents light transmission in the regions between the picture elements 530 that would otherwise partially illuminate the tinted stripes 1410 of the color filter mask 440. Such illuminations would reduce the color contrast, saturation and purity of the display module 100. Alternatively, the thin seal display 430 regions outside the electrically conductive strips 640 shown in FIG. 11 may be coated with an opaque material to prevent light transmission in these regions between the picture elements 530.

Figure 19:
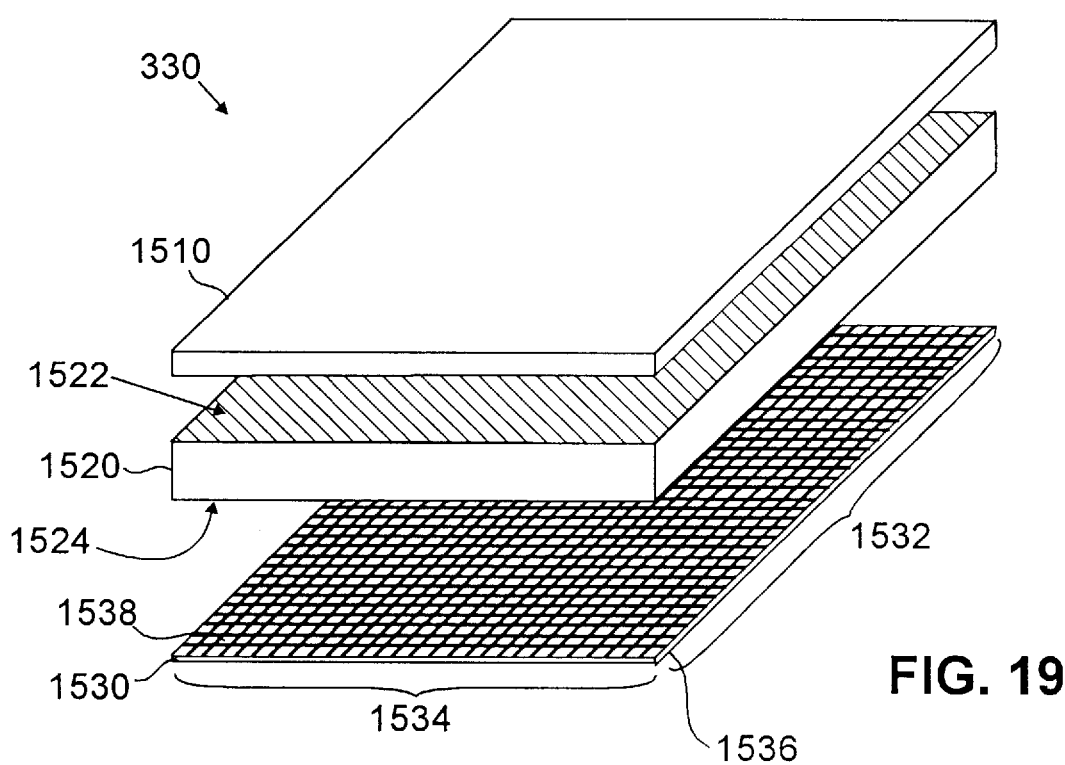
FIG. 19 is an exploded parts view of a global cover glass assembly in the tiled display system of FIG. 3.

In the assembled modular tiled display system 1, the global cover glass assembly 330 of FIG. 3 is positioned in front of the array of display modules 100 and the corresponding color filter masks 440. An exploded parts view of a suitable global cover glass assembly 330 is depicted in FIG. 19. The global cover glass assembly 330 comprises a global front viewing screen or diffuser 1510, a glass plate 1520 and an optional global black mask 1530. The global front diffuser 1510 and black mask 1530 may be attached to the respective major surfaces 1522 and 1524 of the glass plate 1520 by transparent adhesives, such as those known in the art. In addition, a global color filter (not shown) may be incorporated into the global cover glass assembly 330 in order to eliminate the need of the local color filter masks 440 in the display modules 100, shown in FIG. 4. Such a global color filter may be constructed of one large sheet of a suitable material or an array of smaller color filter sheets which may be easier to manufacturer.

The global front diffuser 1510 may be a viewing screen well known in the liquid crystal display art which increases the viewing angle of the thin seal display 430 by distributing the light exiting the color filter 440 of the display 430 over a wider angle. The global front diffuser 1510 should achieve sufficient light diffusion to provide the desired compromise between an adequate viewing angle and display contrast and brightness. The front diffuser 1510 may optionally be positioned adjacent surface 1524 of the global cover glass assembly 330. In an alternative global cover glass assembly 330, the front diffuser 1510 may be omitted if the glass plate 1520 is suitably frosted to cause the desired light diffusion.

The global black mask 1530 consists of an array of row and column opaque stripes 1532 and 1534, respectively, on a transparent sheet 1536. The overlapping of the opaque stripes 1532 and 1534 should be arranged to produce transparent mask openings 1538 that light may pass through. The size and alignment of the mask openings 1538 with respect to the pixels 1310, shown in FIG. 13, will now be described with reference to FIGS. 20A and 20B.

Figure 20A:
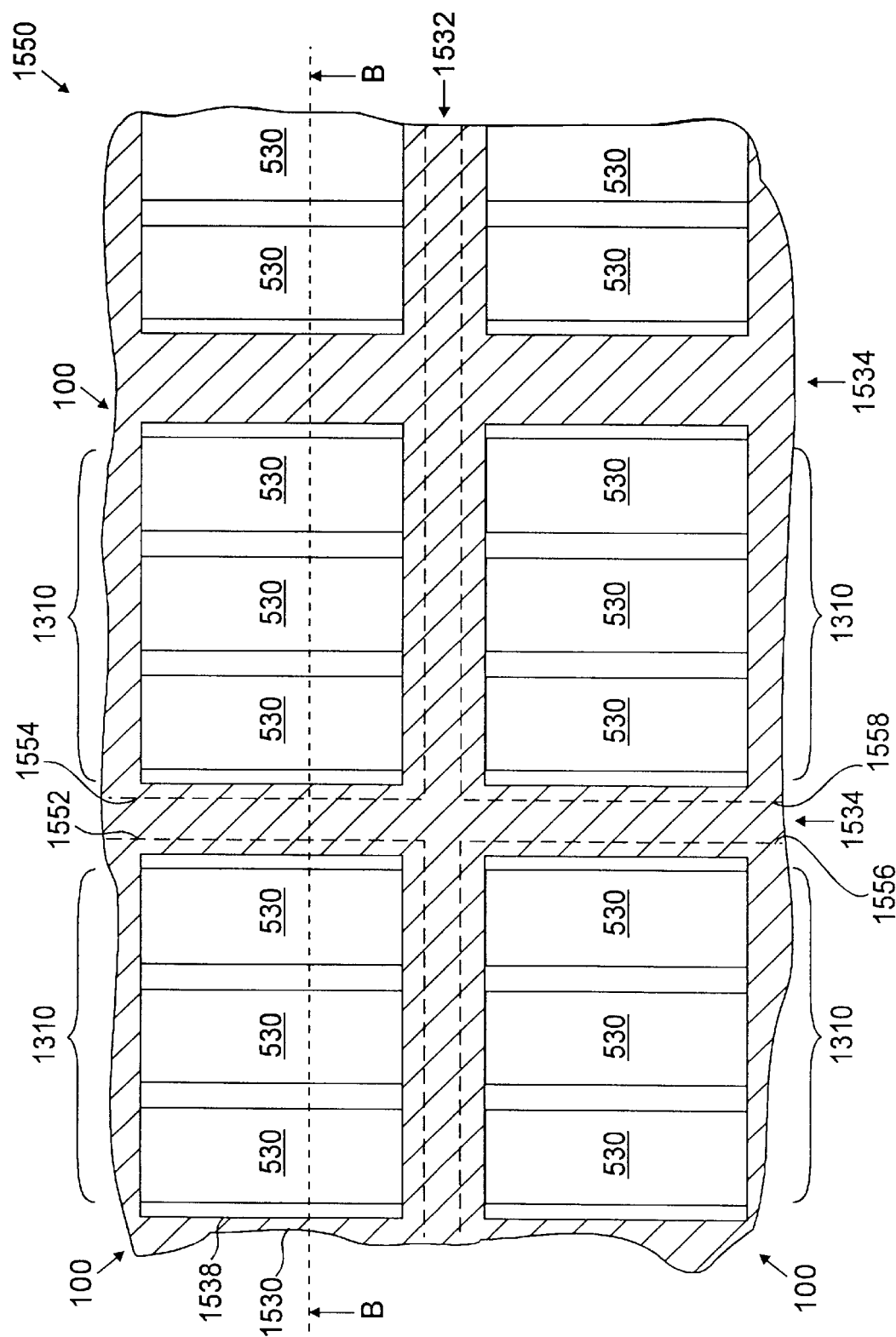
FIG. 20A is a top view of a portion of a global black mask over corresponding corners of four adjacent display modules in the tiled display system of FIG. 3.

FIG. 20A depicts a portion 1550 of the global black mask 1530 positioned over the color filter mask 440 and picture elements 530 of corresponding corner pixels 1310 of four adjacent display modules 100 in the filed display system 1 of FIG. 1. The edges of the thin seal displays 430 of the four adjacent display modules 100 are represented by edge shadow lines 1552, 1554, 1556 and 1558. The width and separation of the opaque stripes 1532 and 1534 in the global black mask 1530 should correspond to the positioning and distance between the pixels 1310 of the respective display modules 100 in the tiled display system 1.

Figure 20B:
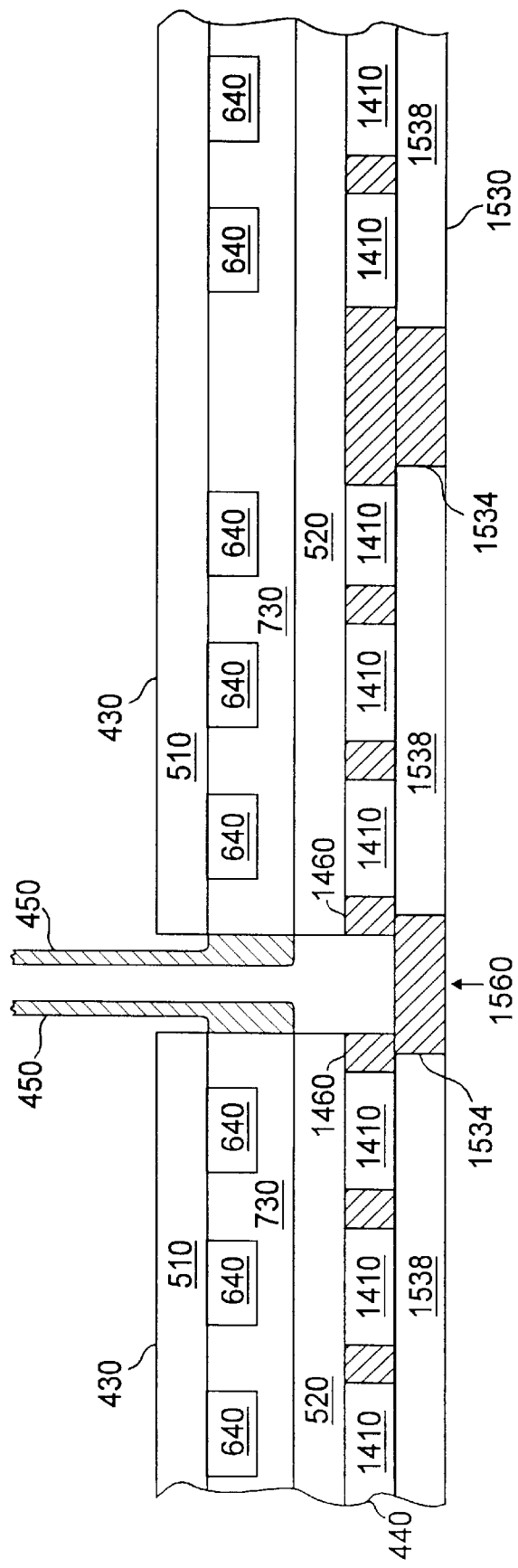
FIG. 20B is a cross-sectional view of the configuration in FIG. 20A.

A cross-sectional view of the portion 1550 of the global black mask 1530 and the corresponding portions of the color filter masks 440 and thin seal displays 430 taken along a line B in FIG. 20A is shown in FIG. 20B. In FIG. 20B, reference numbers concerning the cross-section of the thin seal displays 430 are identical to those reference numbers used for the thin seal display 430 in FIG. 11 for clarity, for example, the substrates 510 and 520 and the electrically conductive stripes 640. Correspondingly, the reference numbers regarding the color filter mask 440 and global black mask 1530 in FIGS. 18, 19 and 20B, are like numbered for clarity. The electrical edge contacts 432 in FIG. 11 to which the thin connectors 450 are attached have not been shown in FIG. 20B for clarity.

In FIG. 20B, the width of the color stripes 1410 of the color filter mask 440 is slightly greater than the width of the electrically conductive strips 640 which define the width of the corresponding picture elements 530 to accommodate the spreading of the light exiting the picture elements 530 as is described below with reference to FIG. 18. Likewise, the width and alignment of the global black mask openings 1538 are greater than the width of the groups 1420 of colored stripes 1410 for a column of pixels 1310 to further accommodate the spreading of light exiting the color filter mask 440. A suitable width of the opaque stripes 1534 is approximately 0.008 inches when the boundary stripes 1410 of adjacent groups 1420 are separated by 0.010 inches for columns of boundary picture elements 530 separated by a distance of approximately 0.014 inches as shown in FIG. 17. The color stripes 1410 of the color filter mask 440 and opaque stripes 1534 of the global black mask 330 are represented as extending through their respective translucent sheets for clarity. However, the color stripes 1410 and opaque stripes 1534 should be disposed on the respective surfaces of the color filter mask 440 and global black mask 1530 that face one another to reduce the effects of parallax. Printing is a suitable method for disposing the stripes 1410 and 1530 on the respective surfaces.

Opaque stripes 1534 having a width of 0.008 inches are suitable to block the mechanical seams between adjacent thin seal displays 430 when the thin seal displays and corresponding display modules 100 are positioned 0.004 inches apart from one another. For example, the opaque stripe 1534 having a width of 0.008 inches in FIG. 20B would overlap each one of the corresponding substantially black edge stripes of the color filter mask 440 by 0.002 inches if the respective thin seal displays 430 were separated by 0.004 inches.

As a consequence, the spacing and width of the opaque stripes 1532 and 1534 operate to block the mechanical seams between the adjacent display modules 100 of the tiled display system 1, and row and column conductors within an active matrix thin seal display. As a result, a viewer observing an assembled tiled display system 1 at close proximity would see a large array of pixels 1310 separated by black stripes 1532 and 1534 of the global black mask 1530 without any detection of the actual display module 100 configuration beneath the global cover glass assembly 330.

To further achieve the seamless appearance of the tiled display system 1, the pixels 1310 of the display modules 100 must be substantially in alignment with the mask openings 1538 of the global black mask 1530 in the cover glass assembly 330 of FIG. 3. The stripes 1532 and 1534 of the global black mask 1530 operate as a grid for alignment purposes. Small adjustments of the display modules 100 in the vertical and horizontal directions can be made by the alignment devices 320 that secure each of the display modules 100 to the base plate 310 as shown in FIG. 3.

The alignment devices 320 further permit the realignment of the display modules 100 whose alignment may change over time and temperature as a function of the material characteristics of the base plate 310 to which the display modules 100 are attached as is shown in FIG. 3. However, the more stable the base plate 310 material, the less correction of the alignment due to time and temperature is required. A suitable stable base plate material is mica enhanced aluminum.

The global cover glass assembly 330 is held against the display modules by a biasing force generated by the standoffs 342 and 344 shown in FIG. 3. As a consequence, the biasing force maintains direct contact and alignment between the display modules 100 and the global black mask 1530 independent of thermal expansion or contraction of the display modules 100. In an alternative configuration, individual devices may be utilized to bias each one of the display modules 100 against a global cover glass assembly 330 having a fixed position.

Figure 21:
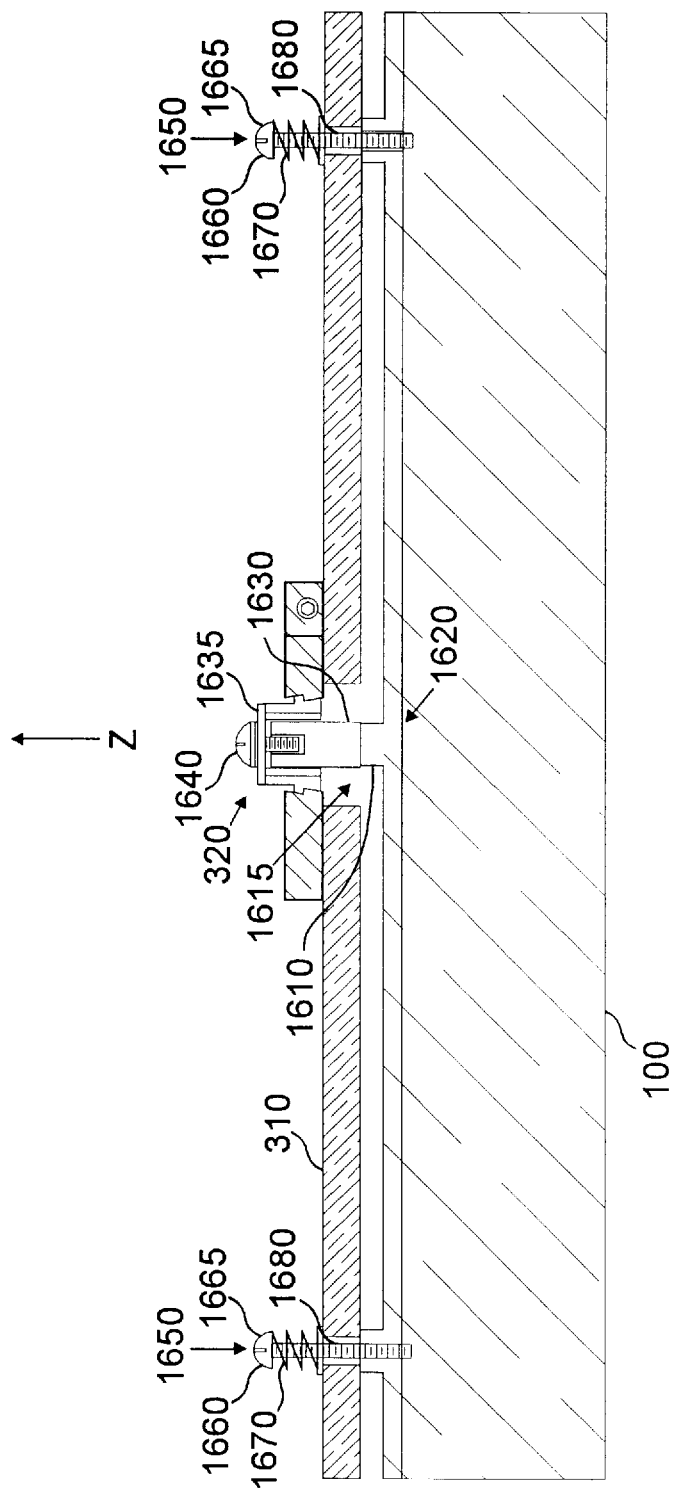
FIG. 21 is a cross-sectional view of an alignment device utilized in attaching a display module to a base plate of the tiled display system of FIG. 3.

FIG. 21 depicts a cross-sectional view of an assembly 1600 consisting of one suitable module alignment device 320 attached to a display module 100 and a corresponding portion of the base plate 310 of FIG. 3. In FIG. 21, a post 1610 is mounted in a center region 1620 of the display module 100. The post 1610 extends from the display module 100 through a hole 1615 in the base plate 310 and is slidably mounted to the alignment device 320 by a bushing 1630, a wisher 1635 and a screw 1640. The post 1610 is permitted to move back and forth in a direction Z within the bushing 1630. The hole 1615 should have a substantially larger diameter than a diameter of the post 1610 and bushing 1630 so as not to impede horizontal and vertical movement of the post 1610 by the alignment device 320.

Also shown in FIG. 21 are compression devices 1650 that provide a biasing force which holds the display module 100 against the base plate 310. The compression devices 1650 assist in maintaining alignment of the display module 100 when the tiled display system 1 is subjected to shock or vibration. One compression device 1650 may be used for each one of the four corners of the display module 100. Since FIG. 21 is a cross-sectional view of the assembly 1600, only two of the four compression devices 1650 have been shown. Each compression device 1650 contains a screw 1660 having a screw head 1665, and a coil spring 1670.

The screw 1660 of each of the compression devices 1650 extend through holes 1680 in the base plate 310 and are secured to the module 100. The diameter of the holes 1680 are larger than the diameters of the screw 1660 to permit adjustment of the display module 100 in the vertical and horizontal direction by the alignment device 320. In operation, the springs 1670 operate to push on the screw heads 1665 to pull the display module 100 toward the base plate 310. The compression devices 1650 should provide a sufficient force to allow the display modules 100 to slide across the base plate 310 during thermal expansion or contraction of the display module 100 relative to the base plate 310.

Figure 22:
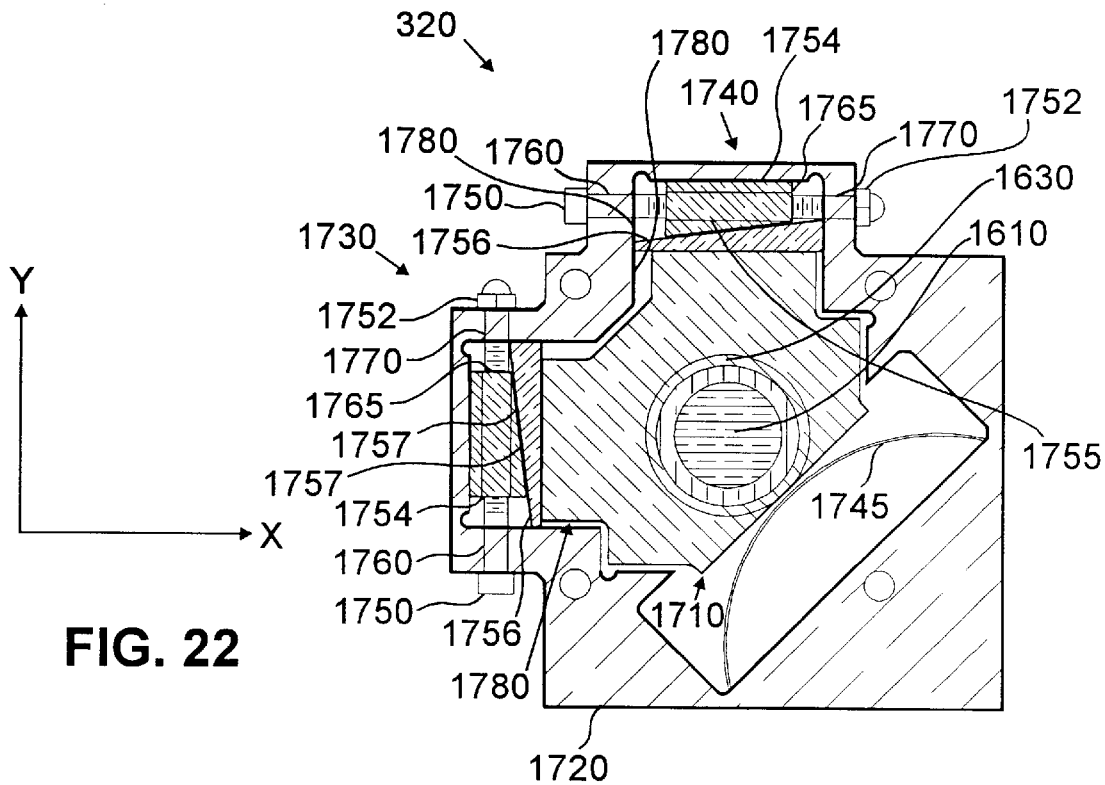
FIG. 22 is a bottom view of the alignment device of FIG. 21.

FIG. 22 depicts a bottom view of the alignment device 320 of FIG. 21. In FIG. 22, the bashing 1630 holding the post 1610 is fixed to an inner retainer 1710 by the screw 1640 and washer 1635 shown in FIG. 21. During the compression of display module 100 on the base plate 310 by the compression devices 1650, the post 1610 slides within the bushing 1630. The inner retainer 1710 is movably mounted in an outer retainer 1720 and is capable of sliding back and forth in directions X and Y within the outer retainer 1720 as shown in FIG. 22. Adjustment of the position of the inner retainer 1710 relative to the outer retainer 1720 is caused by horizontal and vertical screw adjuster assemblies 1730 and 1740, and a spring, such as a leaf spring 1745, which is mounted to the outer retainer 1720.

Each of the screw adjuster assemblies 1730 and 1740 includes a screw 1750, a corresponding screw cap 1752, a captured wedge-shaped block 1754 and a free wedge-shaped block 1756. Each screw 1750 extends through a first hole 1760 in the outer retainer 1720, a threaded through hole 1765 of the captured block 1754, and a second hole 1770 in the outer retainer 1720. The screw cap 1752 is locked onto the portion of the screw 1750 that extends beyond the second outer retainer hole 1770.

In operation of the horizontal adjustment assembly 1730, rotation of the screw 1750 advances or reverses the position of the captured block 1754 in the direction Y by the engagement of the threaded hole 1765 by threads of the screw 1750. Movement of the captured block 1754 in the Y direction causes engagement of angle edge faces 1755 and 1757 of the wedge-shaped blocks 1754 and 1756, respectively. Since the free wedge-shaped block 1756 of the horizontal screw adjuster 1730 is only permitted to move forwards or backwards in the direction X within a channel 1780 of the outer retainer 20, a force in the direction X is applied to the inner retainer 1710. This force counteracts the force generated by the spring 1745 on the inner retainer 1710 in the direction opposite to the direction X. As a result, the inner retainer 1710 moves in the direction X. As the inner retainer 1710 is moved in the direction of X, the post 1610 and corresponding display module 100 will also move in the direction X. The amount of force on the free block edge 1780 generated by the rotation of the screw 1750 is a function of the respective wedge angles of the blocks 1754 and 1756 and the spring 1745.

In a similar manner, as the screw 1750 of the screw adjuster assembly 1730 is rotated in the opposite direction, the captured block 1754 moves in the direction opposite to the direction Y. The movement of the captured block 1754 in this direction lessens the force applied to the free block 1756 in the direction X until the force is less than the opposite force generated by the spring 1745. The greater force against the inner retainer 1710 applied by the spring 1745 causes the inner retainer 1710 to move in the direction opposite to the direction X. Therefore, rotation of the screw 1750 of the horizontal adjustment assembly 1730 moves the display module 100 forwards or backwards in the direction X.

The vertical screw adjuster assembly 1740 operates in a substantially similar manner to the horizontal screw adjuster assembly 1730 and moves the inner retainer 1710 and the corresponding attached display module 100 forward or backward in the direction Y. The maximum displacement of the display module 100 in the directions of X or Y is limited by the widths of the channels 1780 of the outer retainer 1720 and the wedge angles of the respective blocks 1754 and 1756. Thus, the adjustment device 320 of FIGS. 21 and 22 enables the horizontal and vertical alignment of the display module 100 with respect to adjacent display modules 100 and the global black mask 1530 within the global cover glass assembly 330 in the tiled display system 1 of FIG. 3. An alternative configuration of the alignment device 320 may include a skew adjuster that operates in a substantially similar manner to the horizontal and vertical screw adjusters 1730 and 1740 to adjust the rotation orientation of the display module 100 about the post 1610.

Figure 23:
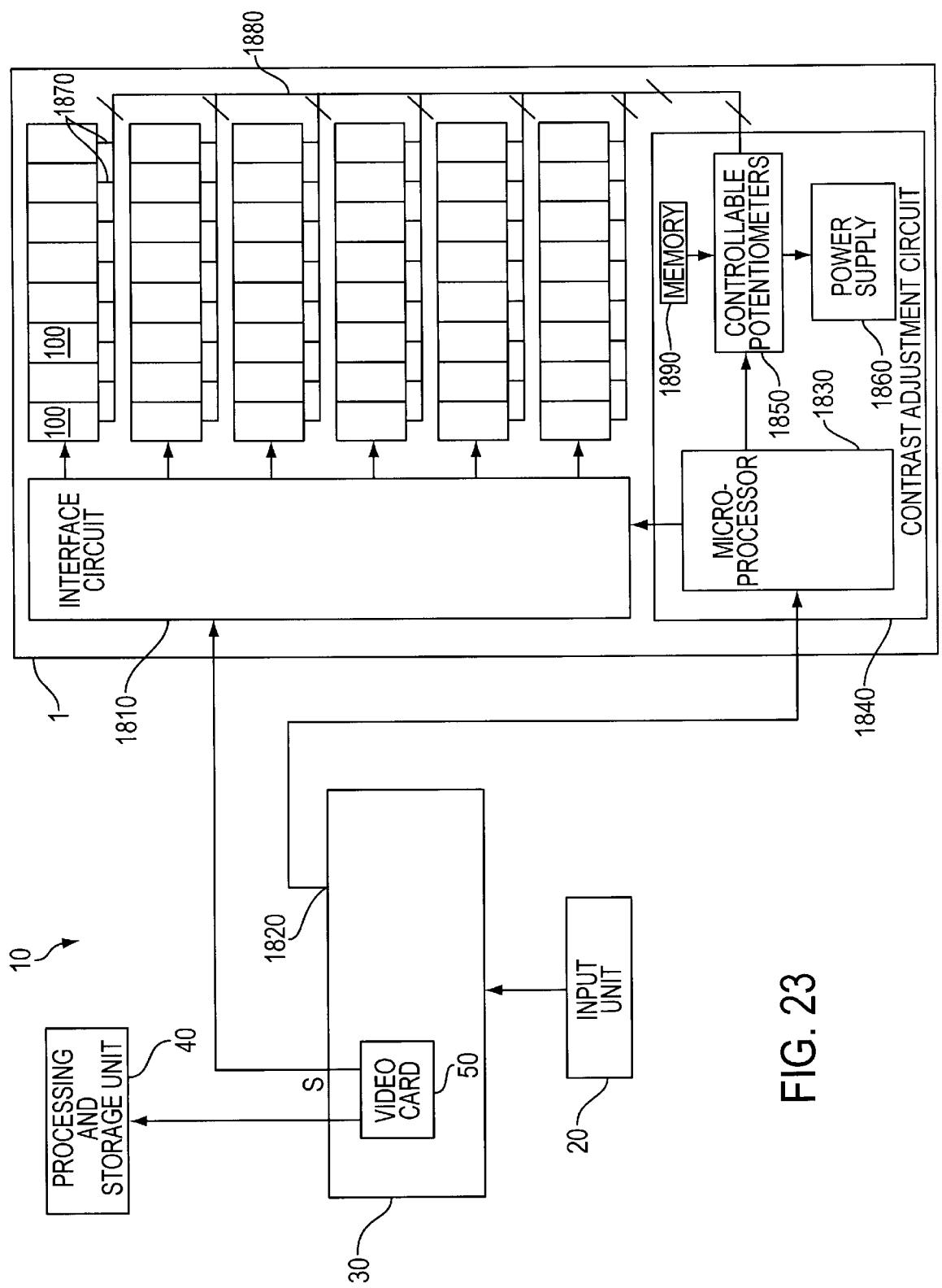
FIG. 23 is a schematic diagram of the computer system of FIG. 1.

FIG. 23 is a schematic representation of the computer system 10 of FIG. 1. Similar components in FIGS. 1 and 23 are like numbered for clarity, for example, the video card 50, the processing and storage unit 40 and the display modules 100. In FIG. 23, the video card 50 is shown in the processing and storage unit 30 which has the attached input unit 20. The video card 50 is connected to an interface circuit 1810 disposed in the tiled display system 1 and the optional output device 40. The interface circuit 1810 receives the LCD driver signals S from the video card 50 and provides the corresponding row and column display information to the 8-by-6 array of passive matrix TN liquid crystal display modules 100.

Also shown in the processing and storage unit 30 is a data output port, such a standard PC computer serial output 1820. The data output port 1820 is connected to a processing unit, such as a microprocessor 1830, located in a contrast adjustment circuit 1840 in the tiled display system 1. The microprocessor 1830 is also connected to the interface circuit 1810 and a plurality of controllable potentiometers, such as individually addressable, digitally controlled potentiometers 1850 in the contrast adjustment circuit 1840. In the alternative, individual electrically erasable, programmable potentiometers may be disposed in each one of the display modules 100. Suitable controllable potentiometers 1850 are commercially available from Xicor, Inc. of Filipitas, Calif. The controllable potentiometers 1850 are further connected to a power supply 1860, and a negative voltage input 1870 of each of the respective display modules 100 by individual power lines represented by a line 1880.

The processing unit 1830 facilitates contrast adjustment of the display modules 100 and provides stand alone operation of a self-test and calibration of the tiled display system 1. The stand alone self-test and calibration operations may utilize available fixed display patterns for optical and mechanical calibration, as well as verification of interface electronics operation of the interface electronics circuit 1810.

The processing unit 1830 communicates with suitable programmed routines in the processing and storage unit 30 to adjust the controllable potentiometers 1850 which vary the voltages applied to the negative voltage inputs 1870 of the display modules 100. The optical performance of the individual displays 430 may be altered with respect to contrast and transmission by adjusting the applied voltage to the negative voltage inputs 1870 of the individual display modules 100. Contrast is the ratio of the measured luminance from an active or "on" picture element 530 of FIG. 5 as compared with the inactive or "off" picture element 530. Transmission is the ratio of the measured luminance from an active picture element 530 as compared to the luminance supplied at the rear surface of the liquid crystal display 430.

As the voltage is increased or decreased at the display module negative voltage input 1870, the contrast and transmission will vary in a predetermined manner. A representation of transmission and contrast curves 1910 and 1920 for a typical passive matrix TN display 430 is shown in a chart 1900 in FIG. 24. Since the typical transmission and contrast characteristics may vary between displays 430, viewers will be able to see differences in the contrast and brightness of adjacent displays 430 in the tiled display system 1 absent any adjustment. Manufacturing tolerances of the thin seal displays 430 within the display modules 100 of FIG. 4 may be increased such that each display module 100 performs substantially identically to one another. However, a more cost effective technique to achieve identical performance is to adjust the transmission and contrast of each display module 100 by varying the display panel negative input voltages 1870 using the controllable potentiometers 1850 as shown in FIG. 17.

The controllable potentiometers 1850 may also be connected to, or contain, electrically alterable memory 1890 to permanently retain the last potentiometer setting when power is removed. As a result, when the tiled display system 1 is next powered on, each display module 100 will be returned to its previously adjusted voltage setting and corresponding optical performance.

Figure 25:
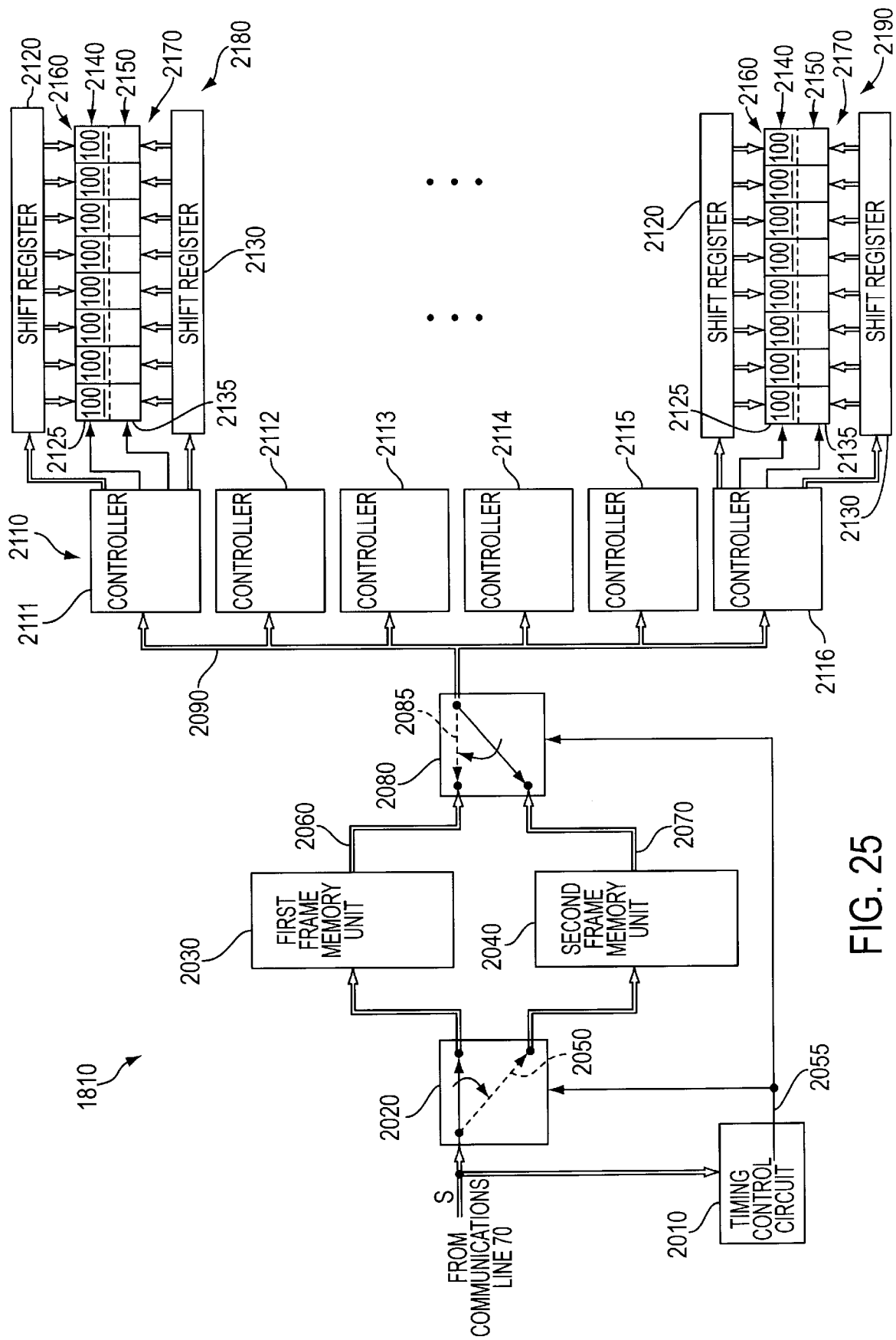
FIG. 25 is a detailed schematic diagram of an interface circuit utilized in the tiled display system of the computer system in FIG. 23.
Figure 26:
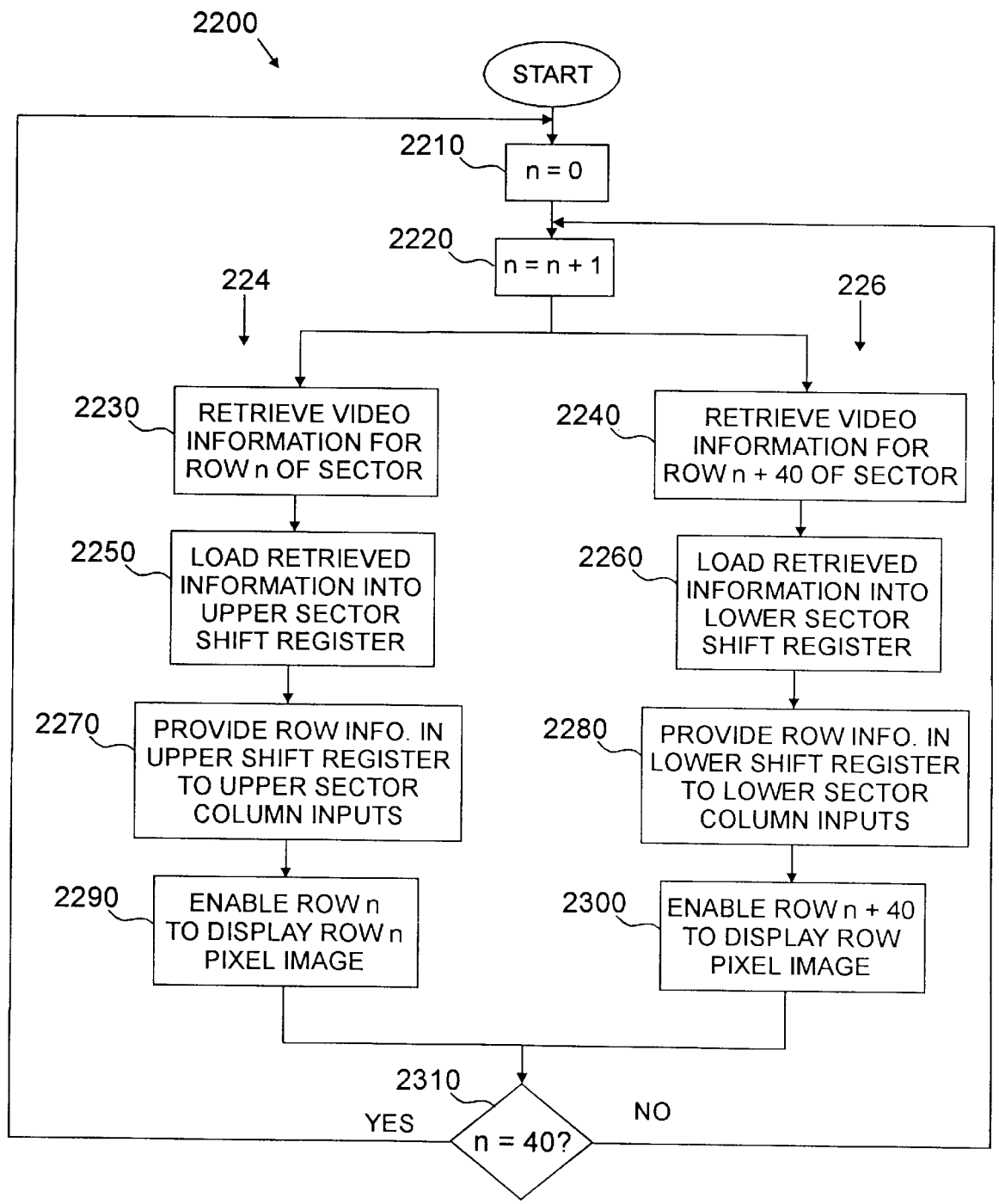
FIG. 26 is a flow chart of a method utilized by subcontrollers in the interface circuit of FIG. 25 to produce an image on the tiled display system of FIGS. 1 and 2.

A detailed schematic representation of one suitable electronic interface circuit 1810 for controlling the image displayed in the tiled display system 1 is shown in FIG. 25. In FIG. 25, the LCD driver signals S containing the row and column display information from the communications line 70 is provided to a timing control circuit 2010 and a first switch 2020. The switch 2020 is capable of operating in a first or second position, and is further connected to a first frame memory unit 2030 and a second frame memory unit 2040. In a first position as shown in FIG. 25, the switch 2020 provides the row and column information to the first frame memory unit 2030, and in the second position as shown by a dashed line 2050, the row and column information is provided to the second frame memory unit 2040. The position of the first switch 2010 is governed by the timing control circuit 2010 as shown by the control line 2055.

The first and second memory units 2030 and 2040 are each capable of storing a frame of display information from the received row and column information. The memory units 2030 and 2040 are connected to first and second memory output buses 2060 and 2070, respectively. Each one of the memory units 2030 and 2040 is capable of substantially simultaneously providing the stored row and column information for twelve respective 640×40 pixel sectors that comprise 640×480 pixels in the array of display modules 100 of the tiled display system 1. The first and second memory output buses 2060 and 2070 are connected to a second switch 2080 in a manner as shown in FIG. 25.

The switch 2080 is capable of operating in a first or second position, and is further connected to a subcontroller information bus 2090. In a first position as shown in FIG. 25, the switch 2080 connects the second memory output bus 2070 to the subcontroller information bus 2090, and in the second position as shown by a dashed line 2085, the switch 2080 connects the first memory output bus 2060 to subcontroller information bus 2090. The position of the second switch 2080 is also governed by the timing control circuit control line 2055.

The subcontroller information bus 2090 is connected to six subcontrollers 2111 through 2116 which are collectively referred to by reference number 2110. Each one of the subcontrollers 2110 is connected to a first and second shift register units 2120 and 2130 and to row selector inputs 2125 and 2135 for upper and lower 80-by-40 pixel sectors 2140 and 2150 for each one in the respective row of eight display modules 100 in the tiled display system 1 shown in FIG. 24. A dashed line 2145 separates the upper and lower sectors 2140 and 2150 of the rows of display modules 100 illustration purposes only.

Each one of the shift register units 2120 and 2130 contains 640 elements and is further connected to 80 column inputs 2160 and 2170 for each one of the upper and lower pixel sectors 2140 and 2150 of the eight display modules 100 in the respective row of display modules 100. The shift registers 2120 and 2130 may be double buffered shift registers well-known in the art which maintain a given output until a new sequence is shifted into the shift register and instructed to be applied to the outputs. For ease of illustration, only configurations for the shift register units 2120 and 2130, and corresponding row of display modules 100 for a first row 2180 and a sixth row 2190 of display modules 100 have been shown. The configuration and operation of each of the second through fifth row of display modules 100 in the tiled display system 1 of FIG. 24 which have not been shown are substantially identical to those for the first andسادس rows 2180 and 2190.

In operation, the timing control circuit 2010 may consist of suitable programmed logic arrays to control the switch 2020 such that row and column information in the LCD driver signals S for each 640-by-480 image frame is sequentially alternatively directed to, and stored in, the first memory unit 2030 and the second memory unit 2040. For example, a first LCD information frame would be directed to, and stored in, the first memory unit 2030, then the timing control circuit 2010 would switch the first switch 2020 to its second position such that a second LCD information frame would be directed to the second memory unit 2040. A third received LCD information frame would then be directed to the first memory unit 2030 and so on. Thus, in VGA compatible 640-by-480 pixel LCD driver signals S, the LCD information frames are consecutively transmitted every 0.0167 seconds, and the timing control circuit 2010 will correspondingly switch the positions of the first switch 2055 every 0.0167 seconds.

The second switch 2080 is also operated by the timing control circuit 2010 such that the operating position of the first and second switches 2020 and 2080 are always changed substantially at the same time. However, the first and second switches 2020 and 2080 are configured so that when the row and column display information is provided to the first memory unit 2030, the second memory output bus 2070 is connected to the subcontroller bus 2090. Likewise, when the row and column display information is provided to the second memory unit 2040, the first memory output bus 2060 is connected to the subcontroller bus 2090. Such a configuration facilitates the displaying of a just received frame of row and column display information while the next frame in the LCD driver signals S is being received. When one of the memory units 2030 and 2040 is not receiving row and column display information, its memory output bus 2060 or 2070 is connected to the subcontroller bus 2090 to provide the stored row and column display information to the associated subcontrollers 2110 by the second switch 2080.

The memory units 2030 and 2040 are configured in such a manner that each output of the outputs 2060 would substantially simultaneously provide row and column display information for each one of the twelve 640-by-40 pixel sectors in the 640-by-480 pixel tiled display system 1. Each one of the subcontrollers 2110 controls a respective double sector of a 640-by-80 pixels displayed by a corresponding row of display modules 100. For instance, the subcontroller 2111 controls the 640-by-80 pixel display formed by a first and second sector 2140 and 2150 of a row 2180 of the display modules 100. The first sector 2140 contains pixel row numbers 1–40 and the second sector 2150 contains pixel row numbers 41–80 of the tiled display system 1. The operations of the subcontrollers 2111–2116 may be performed by suitably programmed programmable logic arrays to minimize the number of components in, and complexity of, the interface circuit 1810.

The manner in which the subcontroller 2111 retrieves row and column display information from the memory units 2030 and 2040, and generates the image displayed on the corresponding first row 2160 of display modules 100 will be described with reference to a flow diagram 2200 shown in FIG. 26. The operation of each one of the other subcontrollers 2112–2116 is substantially identical to, and is performed at substantially the same time as, the operation of the subcontroller 2111. Referring to FIG. 26, an internal counter or register in the subcontroller 2111 represented by the value n is initialized to zero in step 2210, and then incremented in step 2220. Then the subcontroller 2111 proceeds to perform the steps shown in columns 2224 and 2226 in a substantially parallel manner. The two columns 224 and 226 of the routine 2200 perform substantially identical operations. However, the column 2224 performs its operations on the first 40-by-640 pixel sector 2140 corresponding to the pixel row numbers 1–40, while the column 2226 performs its operations on the second 40-by-640 pixel sector 2150 corresponding to the pixel row numbers 41–80.

In steps 2230 and 2240, display information for the rows n and n+40 of the row 2180 of display modules 100 in FIG. 25 is retrieved from the associated memory unit 2030 or 2040 which is currently connected to the subcontroller information bus 2090. Each retrieved row display information characterizes the display information for a complete 640 pixel row across the eight display modules 100 of row 2180. Then in steps 2250 and 2260, the two sets of row information corresponding to the 640 pixel rows are loaded into the respective upper sector shift register 2120 and lower sector shift register 2130, respectively.

Once the row display information is fully loaded into the shift registers 2120 and 2130, the two sets of row information are then provided to the upper and lower sector column inputs 2160 and 2170, respectively, as provided in steps 2270 and 2280. The steps 2160 and 2170 are required only if double buffered shift registers are utilized for the shift registers 2120 and 2130. After the row information has been provided to the outputs of the shift registers 2120 and 2130, the subcontroller 2111 enables the upper and lower sector row selectors 2125 and 2135, respectively, in steps 2290 and 2300, to activate the corresponding rows of 640 pixels corresponding to the values n and n+40 in the display modules 100 of the first row 2180 of the tiled display system 1. For instance, at the time in the routine 2300 where the value n is 1, the first and forty-first row of 640 pixels will be activated within the row 2180 of display modules 100.

After the two respective rows of pixels have been displayed, the subcontroller 2111 determines if the value n is equal to forty in step 2310. If the value n is not equaled to forty, then the routine 2200, increments the value n in step 2220 and repeats the display process of steps 2230–2300 to display the next two corresponding pixel rows in the upper and lower sectors 2140 and 2150 of the first row 2180 of display modules 100. In the alternative, if the value n is determined to be forty in step 2310, then all the display information from the associated memory unit 2030 or 2040 for the forty rows of each of the upper and lower sector 2140 and 2150 for an image frame has been retrieved and displayed in the first row 2180 of display modules 100. As a consequence, the routine 2200 reverts to step 2210 where the value n is reset to zero.

Each of the other subcontrollers 2112 through 2116 generates the portion of the display image on the respective row of the display modules 100 at substantially the same time as the subcontroller 2111 performs the routine 2200. Thus, the subcontrollers 2111–2116 will be displaying twelve pixel rows of the image at any instant in time, wherein each one of the rows appears in the upper and lower sector 2140 or 2150 of the six rows of display modules 100 in the tiled display system 1. Moreover, the twelve rows that are displayed at any instant in the respective upper or lower sectors of each row of display modules 100 are separated from each other by forty pixel rows. The use of twelve forty-row sectors in FIG. 25 is for exemplary purposes only and it is not intended that a tiled display system 1 according to the present invention be limited to using any particular number of sectors or pixel rows. Further, the sectors may be arranged in a column format instead of the row format of FIG. 25.

At substantially the same time as one of the memory units 2030 or 2040 is providing information at its respective information outputs 2060 to the information bus 2090, the other memory unit 2030 or 2040 will be receiving row and column display information from the LCD driver signals S for the next image frame. In this manner, the high multiplex rate of 480:1 of pixel row information per every 0.0167 second frame can be reduced to a lower multiplex rate of 40:1 at the display modules 100 which enables the tiled display system 1 to allow gray-level encoding to be displayed and to achieve an improvement in optical performance. Further, since the interface circuit 1810 is able to slow the timing requirements for the subcontrollers 2110 due to the tiled nature of the display system 1, low cost liquid crystal driver display circuits may be utilized in the subcontrollers 2110.

Although only a few of embodiments of the invention have been described in detail above, those having ordinary skill in the art understand that many modifications are possible without departing form the teaching of the invention. All such modifications are intended to be encompassed within the following claims. For instance, any other type display may be used in the tiled display system, whether possessing a passive or active matrix display. The optional patterned diffuser may alternatively be positioned between the thin seal display and the color filter mask, or between the color filter mask and the global black mask.

We claim:

1. A tiled display system comprising:
   an array of display modules;
   a base plate having a first major surface;
   a plurality of module alignment devices, each one of the module alignment devices attaching a respective display module to the first major surface of the base plate and providing vertical and horizontal adjustment capability to the respective display module; and
   a global cover glass assembly disposed above the display modules.

2. The display system of claim 1 further comprising:
   a rear plate connected to a second major surface of the base plate; and
   a housing connected to the rear plate and surrounding the base plate and display modules, wherein the display modules are protected by the housing and the global cover glass assembly.

3. The display system of claim 1, wherein each one of the display modules comprises:
   a light box having a first open side and paired holes on opposite side walls, with global light sources extending into and through the light box through the paired holes;
   a substantially transparent light box cover positioned adjacent the front open side of the light box; and
   a thin seal display panel being positioned proximate a side of the light box cover opposite the light box light box, the thin seal display containing an array of picture elements and electrical edge contacts.

4. The display system of claim 3, wherein the light box cover spreads a portion of light generated by the global light sources to edge regions of the light box cover that extend parallel to a direction of the light sources in order to substantially balance the light output across the front surface of the light box cover.

5. The display system of claim 4, wherein the light box cover front surface is substantially flat and positioned adjacent the thin seal display, a back surface of the light box cover is positioned adjacent the light box, the back surface having concave surfaces in the edge regions to spread the light generated by the light sources.

6. The display system of claim 5, wherein the light box cover further comprises beveled edges in the edge regions extending parallel to the direction of the light sources.

7. The display system of claim 6, wherein an angle formed by an edge surface of the beveled edges with respect to the adjacent light box sidewalls is on the order of 50 degrees.

8. The display system of claim 3, wherein surfaces of the light box have a substantially white color.

9. The display system of claim 3 further comprising:
   a driver circuit board containing display driver circuits, the driver circuit board being disposed on a rear side of the light box opposite the front open side; and
   at least one thin electrical conductor connecting the thin seal display electrical edge contacts to the display driver circuits.

10. A tiled display system comprising:
    an array of display modules;
    a base plate having a first major surface;
    a plurality of module alignment devices, each one of the module alignment devices attaching a respective display module to the first major surface of the base plate; and
    a global cover glass assembly disposed above the display modules, wherein each one of the display modules comprises:
       a light box having a first open side and paired holes on opposite side walls, wherein global light sources can extend into and through the light box through the paired holes;
       a substantially transparent light box cover positioned adjacent the front open side of the light box; and
       a thin seal display panel being positioned proximate a side of the light box cover opposite the light box light box, the thin seal display containing an array of picture elements and electrical edge contacts, wherein the thin seal display comprises:
          first and second substrates having major surface areas of the substantially the same size;
          a liquid crystal material disposed between major surfaces of the first and second substrates; and
          the thin seal attaching the first and second substrate together and containing the liquid crystal material, the thin seal having a uniform interior edge and an outer edge, the outer edge being substantially in alignment with edges of the first and second substrates, the thin seal being formed by a precision reduction of the substrate edges and seal until the seal is the desired width of the thin seal, wherein the array of picture elements are disposed in a display area formed by sealed area, and the electrical edge contacts, which are electrically connected to the picture elements, are disposed on the edges of the substrates.

11. The display system of claim 10, wherein the array of picture elements are passive matrix picture elements and wherein each picture element is formed by an intersection of row and column conductors electrically connected to the electrical edge contacts.

12. The display system of claim 10, wherein the array of picture elements are active matrix picture elements.

13. The display system of claim 9, wherein boundary picture elements of the array of picture elements adjacent edges of the thin seal display are disposed a particular distance from the edges such that when a similar display module is positioned adjacent the display module, spacing between corresponding boundary picture elements of the display modules is substantially identical to spacing between respective adjacent picture elements in the array of picture elements within one of the same display modules to produce a tiled display system having a seamless appearance.

14. The display system of claim 10 further comprising a color filter mask positioned adjacent the thin seal display wherein the color filter mask provides sufficient coloration of the picture elements to produce a colored display.

15. The display system of claim 14, wherein the color filter mask contains groups of tinted red, green and blue color stripes which are positioned in accordance with respective groups of three picture elements forming respective pixels, and which are slightly wider than a width of the corresponding picture elements.

16. The display system of claim 15, wherein the color stripes and pixels are arranged in a horizontal orientation to improve the horizontal viewing angle.

17. The display system of claim 3, wherein the display module further comprises a patterned light diffuser positioned adjacent the front surface of the light box cover to provide substantially uniform luminance to the thin seal display.

18. The display system of claim 17, wherein the patterned diffuser comprises:
    a translucent sheet;
    a plurality of shaded regions, each one of the regions corresponding to positions of the picture elements in the thin seal display, and containing a particular amount of a shading based on luminance output of a portion of the light box cover corresponding to that region.

19. The display system of claim 18, wherein the particular amount of shading consists of various densities of dots.

20. The display system of claim 1, wherein the global cover glass assembly comprises:
    a transparent plate having first and second major surfaces; and
    a global diffusion mask disposed on the first major surface of the transparent plate.

21. The display system of claim 20, wherein the global cover glass assembly further comprises a global black mask disposed on the second major surface of the transparent plate.

22. A tiled display system comprising:
    an array of display modules;
    a base plate having a first major surface;
    a plurality of module alignment devices, each one of the module alignment devices attaching a respective display module to the first major surface of the base plate; and
    a global cover glass assembly disposed above the display modules, wherein the global cover glass assembly comprises:
        a transparent plate having first and second major surfaces;
        a global diffusion mask disposed on the first major surface of the transparent plate;
        a global black mask disposed on the second major surface of the transparent plate, wherein the global black mask comprises:
            a transparent sheet; and
            an array of row and column opaque strips positioned such that transparent mask openings formed by the opaque stripes correspond to the size, shape and positions of the pixels, wherein the opaque stripes mask the regions between pixels on each of the display modules and between boundary pixels of adjacent display modules to produce the tiled display system that is seamless in appearance.

23. The display system of claim 1, wherein the global cover glass assembly is a frosted glass plate.

24. The display system of claim 1, wherein each one of the alignment devices is attached to a second major surface of the base plate and to the respective one of the display modules adjacent the first major surface of the base plate by a post extending through a corresponding hole in the base plate, wherein each one of the alignment devices is capable of moving the respective display module in a horizontal and a vertical direction relative to the other display modules.

25. The display system of claim 24, wherein each alignment device comprises:
    an outer retainer;
    an inner retainer contained within the outer retainer, the inner retainer being attached to the post that is fixed to the corresponding display module;
    vertical and horizontal screw adjuster assemblies which are cable of providing a force on the inner retainer in the vertical and horizontal directions; and
    a spring for providing a biasing force on the inner retainer in directions opposite to the forces generated by the screw adjusters.

26. A tiled display system comprising:
    an array of display modules,
    a base plate having a first major surface;
    a plurality of module alignment devices, each one of the module alignment devices attaching a respective display module to the first major surface of the base plate; and
    a global cover glass assembly disposed above the display modules, wherein each one of the alignment devices is attached to a second major surface of the base plate and to the respective one of the display modules adjacent the first major surface of the base plate by a post extending through a corresponding hole in the base plate, wherein each one of the alignment devices is capable of moving the respective display module in a horizontal and a vertical direction relative to the other display modules, wherein each alignment device comprises:
        an outer retainer;
        an inner retainer contained within the outer retainer, the inner retainer being attached to the post that is fixed to the corresponding display module;
        vertical and horizontal screw adjuster assemblies which are cable of providing a force on the inner retainer in the vertical and horizontal directions; and
        a spring for providing a biasing force on the inner retainer in directions opposite to the forces generated by the screw adjusters, wherein each one of the vertical and horizontal screw adjusters comprises:
            a screw having a head and an end;
            a corresponding screw end cap attached to the screw end;
            a captured wedge-shaped block having a threaded through hole; and
            a free wedge-shaped block, wherein the screw extends through a first hole in the outer retainer, the threaded screw hole of the captured block and second hole in the outer retainer, the screw end being located outside of the outer retainer and is capped by the screw end cap such that the screw may be rotated within the outer retainer to move the captured block forward or backward relative to the screw, an angled edge surface of the captured block engages an angled edge surface of the free block to exert a force orthogonal to the direction of movement of the captured block, the force acting against the spring to move the inner retainer forward or backward in the direction of the created force.

27. The display system of claim 24, further comprising compression devices attached to each one of the display modules and the base plate to provide a compression force to hold the display modules against the base plate in order to maintain alignment of the display module and to permit thermal expansion or contraction of the display module relative to the base plate.

28. The display system of claim 27, wherein each one of the compression devices comprises:
   a screw having a head and an end, the screw end being attached to the display module and extending through a hole in the base plate such that the screw head is adjacent the second major surface of the base plate; and
   an extension coil spring positioned between the screw head and to the base plate proximate the corresponding hole such that the display module is forced in a direction toward the first major surface of the base plate.

29. The display system of claim 1 further comprising:
   a contrast adjustment circuit having a plurality of outputs, each one of the outputs being connected to a voltage input of a respective display module, wherein the contrast adjustment circuit is capable of varying the voltage applied to the display module voltage inputs to adjust the contrast and transmission characteristics of each one of the thin seal displays such that each one of the thin seal displays has substantially similar brightness and contrast characteristics.

30. The display system of claim 29, wherein the contrast adjustment circuit comprises:
   a processing unit;
   a plurality of controllable potentiometers having a plurality of inputs and corresponding outputs, the electrical resistance between the inputs and outputs of the controllable potentiometers being controlled by signals received from the processing unit, each one of the outputs of the controllable potentiometers being connected to a corresponding voltage input of the display modules; and
   a power supply connected to the plurality of controllable potentiometers, wherein the processing unit is capable of controlling the electrical resistance of the potentiometers to vary the voltage applied to the display modules.

31. A tiled display system comprising:
   array of display modules;
   a base plate having a first major surface;
   a plurality of module alignment devices, each one of the module alignment devices attaching a respective display module to the first major surface of the base plate;
   a global cover glass assembly disposed above the display modules; and
   an interface circuit capable of producing an image on the tiled display system based on driver signals received by the display system, wherein the interface circuit comprises:
      a first switch having an input and first and second outputs;
      first and second memory units, each memory unit having an input and a plurality of sector information outputs and being capable of storing a frame of display information, the inputs of the first and second memory units being connected to the corresponding first and second outputs of the first switch, wherein row and column information in the driver signals being applied to the first switch input is directed to the first memory unit input when the first switch is in a first position and to the second memory unit input when the first switch is in a second position;
      a second switch having a plurality of outputs and a plurality of corresponding first and second inputs, the plurality of first and second inputs being connected to corresponding sector information outputs of the frame memory units, wherein when in a first position the second switch connects the first frame memory unit outputs to the outputs of the second switch or when in a second position the second switch connects the second frame memory unit outputs to the output of the second switch;
      a plurality of video subcontrollers, each subcontroller connected to at least one of the plurality of outputs of the second switch and controlling a corresponding sector of the array of thin seal displays in the tiled display system; and
      a timing control circuit receiving the driver signals and controlling the positions of the first and second switches such that a frame of the row and column display information is sequentially alternatively provided to and stored in the first and second frame memory units while the information sector outputs of the frame memory unit not receiving the driver signals is connected to the subcontrollers, wherein the memory units are capable of providing information for each sector to the corresponding subcontrollers at substantially the same time such that each sector of the array of thin seal displays are updated at substantially the same time.

32. The display system of claim 31, wherein the interface circuit further comprises:
   at least one shift register connected to a corresponding one of the subcontrollers and to corresponding rows of picture elements in the sector; and
   row select inputs of a sector of display modules connected to the subcontrollers, wherein each one of the subcontrollers is capable of sequentially providing a picture element for each row of the sector to the shift register and sequentially activating each corresponding row of sector picture elements by the row select inputs to activate all the picture elements in the sector to form the display image.

33. A display module for use in a tiled modular display system comprising:
   a light box having a first open side and paired holes on opposite side walls, with global light sources extending into and through the light box through the paired holes;
   a substantially transparent light box cover positioned adjacent the front open side of the light box; and
   a thin seal display panel being positioned proximate a side of the light box cover opposite the light box, the thin seal display containing an array of picture elements and electrical edge contacts.

34. The display module of claim 33, wherein the light box cover spreads a portion of light generated by the global light sources to edge regions of the light box cover that extend parallel to a direction of the light sources in order to substantially balance the light output across the front surface of the light box cover.

35. The display module of claim 34, wherein the light box cover front surface is substantially flat and positioned adjacent the thin seal display, a back surface of the light box cover is positioned adjacent the light box, the back surface having concave surfaces in the edge regions to spread the light generated by the light sources.

36. The display module of claim 35, wherein the light box cover further comprises beveled edges in the edge regions extending parallel to the direction of the light sources.

37. The display module of claim 36, wherein an angle formed by respective edge surfaces of the beveled edges with respect to the corresponding adjacent light box sidewalls is on the order of 50 degrees.

38. The display module of claim 33, wherein surfaces of the light box have a substantially white color.

39. The display module of claim 33 further comprising:
   a driver circuit board containing display driver circuits, the driver circuit board being disposed on a light box back side opposite the front open side; and
   at least one thin electrical conductor connecting the thin seal display electrical edge contacts to the display driver circuits.

40. A display module for use in a tiled modular display system comprising:
   a light box having a first open side and paired holes on opposite side walls, wherein global light sources can extend into and through the light box through the paired holes;
   a substantially transparent light box cover positioned adjacent the front open side of the light box; and
   a thin seal display panel being positioned proximate a side of the light box cover opposite the light box, the thin seal display containing an array of picture elements and electrical edge contacts, wherein the thin seal display comprises:
      first and second substrates having major surface areas of the substantially the same size;
      a liquid crystal material disposed between major surfaces of the first and second substrates; and
      a thin seal attaching the first and second substrate together and containing the liquid crystal material, the thin seal having a uniform interior edge and an outer edge, the outer edge being substantially in alignment with edges of the first and second substrates, the thin seal being formed by a precision reduction of the substrate edges and seal until the seal is the desired width of the thin seal, wherein the array of picture elements are disposed in a display area formed by sealed area, and the electrical edge contacts, which are electrically connected to the picture elements, are disposed on the edges of the substrates.

41. The display module of claim 40, wherein the array of picture elements are passive matrix picture elements and wherein each picture element is formed by an intersection of row and column conductors electrically connected to the electrical edge contacts.

42. The display module of claim 40, wherein boundary picture elements of the array of picture elements adjacent edges of the thin seal display are disposed a particular distance from the edges such that when a similar display module is positioned adjacent the display module, spacing between corresponding boundary picture elements of the display modules is substantially identical to spacing between adjacent respective picture elements in the array of picture elements within one of the same display modules to produce a tiled display system having a seamless appearance.

43. The display module of claim 40 further comprising a color filter mask positioned adjacent the thin seal display wherein the color filter mask provides sufficient coloration of the picture elements to produce a colored display.

44. The display module of claim 43, wherein the color filter mask contains groups of tinted red, green and blue color stripes which are positioned in accordance with respective groups of three picture elements forming respective pixels and which are slightly wider than a width of the corresponding picture elements.

45. The display module of claim 44, wherein the color stripes and pixels are arranged in a horizontal orientation to improve the horizontal viewing angle.

46. The display module of claim 33, wherein the display module further comprises a patterned light diffuser positioned adjacent the front surface of the light box cover to provide substantially uniform luminance to the thin seal display.

47. The display module of claim 46, wherein the patterned diffuser comprises:
   a translucent sheet;
   a plurality of shaded regions, each one of the regions corresponding to positions of the picture elements in the thin seal display, and containing a particular amount of a shading based on luminance output of a portion of the light box cover corresponding to that region.

48. The display module of claim 47, wherein the particular amount of shading consists of various densities of dots.

49. A light source configuration for providing a substantially uniform luminance output to a display module in a tiled modular display system comprising:
   a light box having a first open side and paired holes on opposite side walls such that global light sources may extend into and through the light box through the paired holes;
   a substantially transparent light box cover positioned adjacent the front open side of the light box, wherein the light box cover spreads a portion of light generated by the light sources to edge regions of the light box cover that extend parallel to a direction of the light sources in order to improve the balance of the light output across the front surface of the light box cover.

50. The light source configuration of claim 49, wherein the light box cover front surface is substantially flat and adjacent the thin seal display, a back surface of the light box cover is positioned adjacent the light box, the back surface having concave surfaces in the edge regions to spread the light generated by the light sources.

51. The light source configuration of claim 50, wherein the light box cover further comprises beveled edges in the edge regions extending parallel to the direction of the light sources.

52. The light source configuration of claim 51, wherein an angle formed by respective edge surfaces of the beveled edges with respect to the corresponding adjacent light box sidewalls is on the order of 50 degrees.

53. The light source configuration of claim 49, wherein surfaces of the light box have a substantially white color.

54. A display module alignment device for securing and aligning a display module in a tiled modular display system comprising:
   an outer retainer;
   an inner retainer contained within the outer retainer, the inner retainer being attached to the post that is fixed to the corresponding display module;
   vertical and horizontal screw adjuster assemblies which are capable of providing a force on the inner retainer in the vertical and horizontal directions; and
   a spring for providing a biasing force on the inner retainer in directions opposite to the forces generated by the screw adjusters.

55. A display module alignment device for securing and aligning a display module in a tiled modular display system comprising:

an outer retainer;

an inner retainer contained within the outer retainer, the inner retainer being attached to the post that is fixed to the corresponding display module;

vertical and horizontal screw adjuster assemblies which are capable of providing a force on the inner retainer in the vertical and horizontal directions; and a spring for providing a biasing force on the inner retainer in directions opposite to the forces generated by the screw adjusters, wherein each one of the vertical and horizontal screw adjusters comprises:

a screw having a head and an end;

a corresponding screw end cap attached to the screw end;

a captured wedge-shaped block having a threaded through hole; and a free wedge-shaped block, wherein the screw extends through a first hole in the outer retainer, the threaded screw hole of the captured block and a second hole in the outer retainer, the screw end being located outside of the outer retainer and is capped by the screw end cap such that the screw may be rotated within the outer retainer to move the captured block forward or backward relative to the screw, an angled edge surface of the captured block engages an angled edge surface of the free block to exert a force orthogonal to the direction of movement of the captured block, the force acting against the spring to move the inner retainer forward or backward in the direction of the created force.

56. An interface circuit capable of producing an image on a tiled display system based on driver signals received by the display system, the interface circuit comprising:

a first switch having an input and first and second outputs;

first and second memory units, each memory unit having an input and a plurality of sector information outputs and being capable of storing a frame of display information, the inputs of the first and second memory units being connected to the corresponding first and second outputs of the first switch, wherein row and column information in the driver signals being applied to the first switch input is directed to the first memory unit input when the first switch is in a first position and to the second memory unit input when the first switch is in a second position;

a second switch having a plurality of outputs and a plurality of corresponding first and second inputs, the plurality of first and second inputs being connected to corresponding sector information outputs of the frame memory units, wherein when in a first position the second switch connects the first frame memory unit outputs to the outputs of the second switch or when in a second position the second switch connects the second frame memory unit outputs to the output of the second switch;

a plurality of video subcontrollers, each subcontroller connected to at least one of the plurality of outputs of the second switch and controlling a corresponding sector of the array of displays in the tiled display system; and a timing control circuit receiving the driver signals and controlling the positions of the first and second switches such that a frame of the row and column display information is sequentially alternatively provided to and stored in the first and second frame memory units while the information sector outputs of the frame memory unit not receiving the driver signals is connected to the subcontrollers, wherein the memory units are capable of providing information for each sector to the corresponding subcontrollers at substantially the same time such that each sector of the array of thin seal displays are updated at substantially the same time.

57. The interface circuit of claim 56 further comprising:

at least one shift register connected to a corresponding one of the subcontrollers and to corresponding rows of picture elements in the sector; and row select inputs of a sector of display modules connected to the subcontrollers, wherein each one of the subcontrollers is capable of sequentially providing pixel information for each row of the sector to the shift register and sequentially activating each corresponding row of sector pixels by the row select inputs to activate all the pixels in the sector to form the display image.

58. A method of generating a patterned light diffuser for a light source configuration comprising the steps of:

detecting the luminance output of particular regions across the light source configuration;

generating luminance output values corresponding to the luminance output detected for the detected regions;

identifying the lowest luminance output value;

generating respective correction values corresponding to the difference between the generated luminance output values and the identified lowest luminance output value; and shading areas on a transparent sheet corresponding to the detected regions of the light source configuration, the amount of shading being dependent on the respective generated correction values.

59. The method of claim 58, wherein the step of shading areas comprises generating various densities of dot patterns.

60. The method of claim 59, wherein generation of the dot patterns comprises the steps of:

generating formatted shading printer information based on the generated correction values; and printing on the transparent shading areas based on the formatted information.

* * * * *